(12) United States Patent
Rosenfeld et al.

(10) Patent No.: US 11,922,466 B2
(45) Date of Patent: *Mar. 5, 2024

(54) INTERMEDIARY TECHNOLOGY FOR ONLINE MARKETING

(71) Applicant: Jane Technologies, Inc., Santa Cruz, CA (US)

(72) Inventors: Socrates Munaf Rosenfeld, Santa Cruz, CA (US); Abraham Munaf Rosenfeld, Capitola, CA (US); Benjamin Aaron Green, Newton, MA (US); Howard Hong, Walnut Creek, CA (US); Simon James Roddy, Berkeley, CA (US); Andrew Michael Livingston, Santa Cruz, CA (US); Chunyih Hsu, Seattle, WA (US)

(73) Assignee: Jane Technologies, Inc., Santa Cruz, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/740,801

(22) Filed: May 10, 2022

(65) Prior Publication Data

US 2022/0277357 A1    Sep. 1, 2022

Related U.S. Application Data

(63) Continuation of application No. 17/237,502, filed on Apr. 22, 2021.

(Continued)

(51) Int. Cl.
*G06Q 30/0241* (2023.01)
*G06Q 10/087* (2023.01)
(Continued)

(52) U.S. Cl.
CPC ....... *G06Q 30/0277* (2013.01); *G06Q 10/087* (2013.01); *G06Q 30/0246* (2013.01);
(Continued)

(58) Field of Classification Search
CPC ..... G06Q 30/02–0277; G06Q 30/0623; G06Q 30/0633; G06Q 30/0643
See application file for complete search history.

(56) References Cited

U.S. PATENT DOCUMENTS 7,580,699 B1 * 8/2009 Shaw ..................... G06Q 30/04
                                                           707/999.203
9,836,772 B1   12/2017 Rosenfeld et al.
(Continued)

FOREIGN PATENT DOCUMENTS

WO          WO9803923          1/1998

OTHER PUBLICATIONS

Amazon.com [online], "Dog Bed", published on or before Apr. 21, 2021, retrieved on May 13, 2021, retrieved from URL<https://www.amazon.com/s?k=dog+bed&ref=nb_sb_noss>, 12 pages.

(Continued)

*Primary Examiner* — Raquel Alvarez
(74) *Attorney, Agent, or Firm* — Fish & Richardson P.C.

(57) ABSTRACT

Among other things, advertisements are received for brands or products of brands. Criteria for placement of the advertisements are received at online retail sites. The online retail sites are controlled independently from one another. Inventory data for the products at the online retail sites is received and stored. Data about propensities of the consumers to favor one or more of the brands or one or more products of the brands, from activities of consumers on the online retail sites, is stored. Activity data about current activities of the consumers on the online retail sites is received. One or more of the advertisements are placed on pages served to the (Continued)

Figure 9:
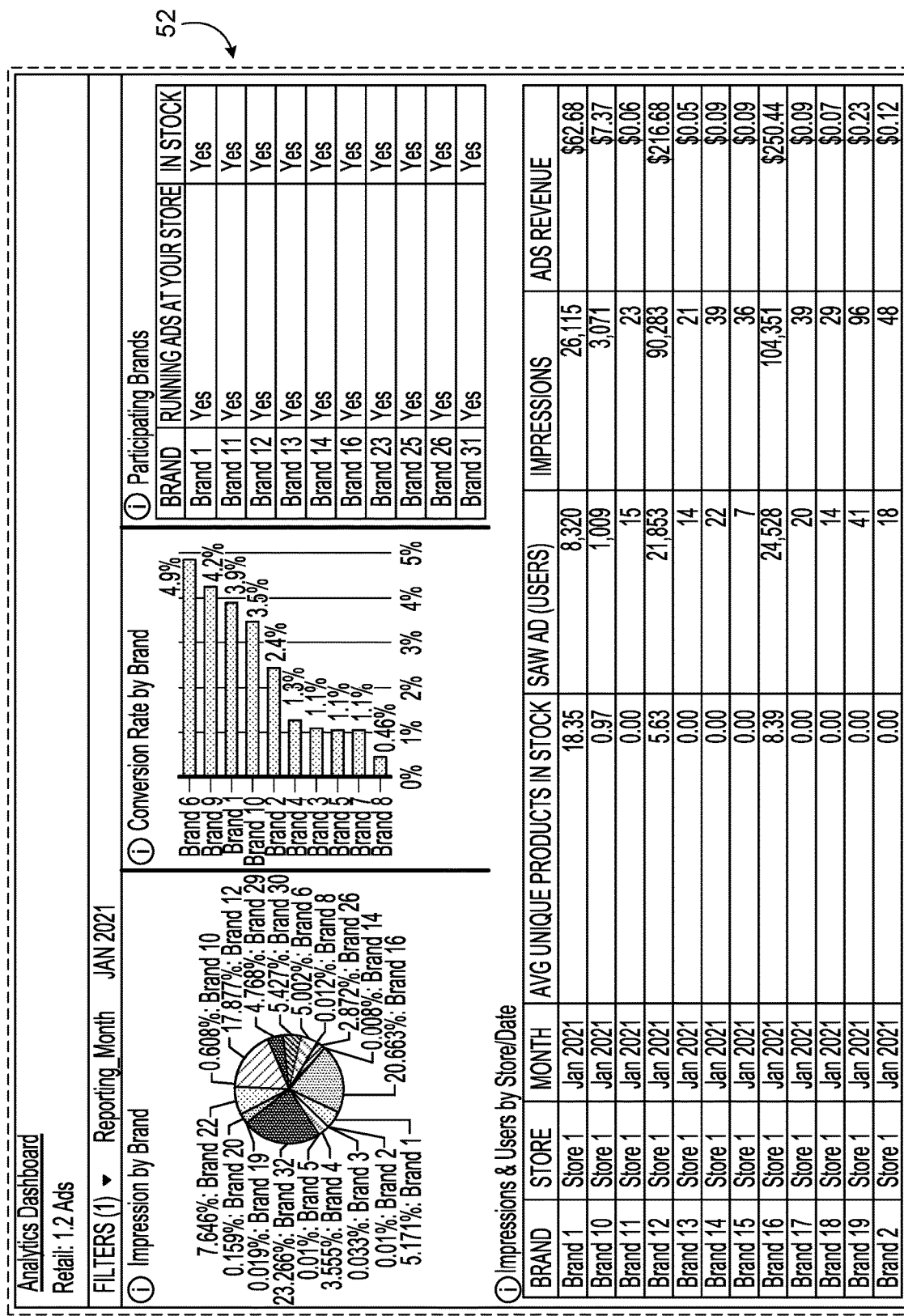

online retail sites based on the placement data, the inventory data, the propensity data, and the activity data. Conversion data is received indicating that consumers engaged in conversion events with respect to products associated with the brands or products of brands being advertised. The brands are charged based on the placing of the advertisements and the conversion events. The online retail sites are paid for the placing of the advertisements and the conversion events.

19 Claims, 16 Drawing Sheets

Related U.S. Application Data

(60) Provisional application No. 63/153,100, filed on Feb. 24, 2021.

(51) Int. Cl.
G06Q 30/0242 (2023.01)
G06Q 30/0251 (2023.01)
G06Q 30/0273 (2023.01)
G06Q 30/0601 (2023.01)

(52) U.S. Cl.
CPC ..... *G06Q 30/0255* (2013.01); *G06Q 30/0269* (2013.01); *G06Q 30/0273* (2013.01); *G06Q 30/0623* (2013.01); *G06Q 30/0633* (2013.01); *G06Q 30/0643* (2013.01); *G06Q 30/0276* (2013.01)

(56) References Cited

U.S. PATENT DOCUMENTS

| | | | |
|---|---|---|---|
| 10,181,142 | B2 | 1/2019 | Rosenfeld et al. |
| 10,664,801 | B1 | 5/2020 | Rosenfeld et al. |
| 11,010,802 | B2 | 5/2021 | Rosenfeld et al. |
| 11,010,811 | B2 | 5/2021 | Rosenfeld et al. |
| 2016/0292746 | A1 | 10/2016 | Kang et al. |
| 2017/0206594 | A1 | 7/2017 | Stausholm et al. |
| 2017/0352078 | A1 | 12/2017 | Rosenfeld et al. |
| 2018/0047078 | A1 | 2/2018 | Rosenfeld et al. |
| 2019/0114686 | A1 | 4/2019 | Rosenfeld et al. |
| 2020/0184415 | A1 | 6/2020 | Rosenfeld et al. |
| 2020/0184417 | A1 | 6/2020 | Rosenfeld et al. |
| 2020/0342401 | A1 | 10/2020 | Rosenfeld et al. |
| 2021/0097593 | A1 | 4/2021 | Rosenfeld et al. |

OTHER PUBLICATIONS

Doordash.com [online], "Run Your Own Marketing on DoorDash", published on or before Apr. 21, 2021, retrieved on May 13, 2021, retrieved from URL<https://help.doordash.com/merchants/s/article/Run-Your-Own-Marketing-on-DoorDash?language=en_US>, 7 pages.
Facebook.com [online], "Reach Out to Future Customers and Fans", published on or before Apr. 21, 2021, retrieved on May 13, 2021, retrieved from URL<https://www.facebook.com/business/ads>, 9 pages.
Google.com [online], "Dog Beds", published on or before Apr. 21, 2021, retrieved on May 13, 2021, retrieved from URL<https://www.google.com/search?q=dog+beds&sxsrf=ALeKk03UzuEK9F1ly4WpEa1YCjBGDuAI4g%3A1620603320264&source=hp&ei=uHGYYKP5DMzP0PEPx9OoGA&iflsig=AINFCbYAAAAAYJh_yPVQ5dvq_9fyLmQvGnxR5-OuVJW-&oq=dog+beds&gs_lcp=Cgdnd3Mtd216EAMyBAgjECcyAggAMgIIADICCAAyAggAMgIIADIFCAAQyQMyAggAMgUIABCSAzICCAA6CAguEMcBEKMCOgIILjoKCC4QxwEQrwEQJ1CqNlibQGCwQ2gAcAB4AIABd4gB1QWSAQM3LjGYAQCgAQGqAQdnd3Mtd216&sclient=gws-wiz&ved=0ahUKEwijteTp4b3wAhXMJzQIHccpCgMQ4dUDCAs&uact=5>, 4 pages.
Homedepot.com [online], "Connect Your Brand To Our Customers", published on or before Apr. 21, 2021, retrieved on May 13, 2021, retrieved from URL<https://www.homedepot.com/c/Retail_Media_Advertising_Solutions>, 13 pages.
Leafly.com [online], "The place for weed", published on or before Apr. 21, 2021, retrieved on May 13, 2021, retrieved from URL<https://www.leafly.com/>, 7 pages.
Spotify.com [online], "Listening is everything", published on or before Apr. 21, 2021, retrieved on May 13, 2021, retrieved from URL<https://www.spotify.com/us/>, 3 pages.
Weedmaps.com [online], "Dispensary Regions", published on or before Apr. 21, 2021, retrieved on May 13, 2021, retrieved from URL<https://weedmaps.com/>, 5 pages.
Yelp.com [online], "Best 10 Restaurants near Downtown, San Jose, CA", published on or before Apr. 21, 2021, retrieved on May 13, 2021, retrieved from URL<https://www.yelp.com/search?cflt=restaurants&find_loc=Downtown%2C+San+Jose%2C+CA>, 5 pages.

* cited by examiner

FIG. 1

Elevated Extracts | All Ads

| Active | Status | ID | Type | Unit | Targets | Impressions | Conversions | Start | End | Model | Budget | Billed |
|---|---|---|---|---|---|---|---|---|---|---|---|---|
| ☑ | | Healthy15018206 | Programmatic | Row | ① | 4 | 0 | 01/28/2021 | 01/19/2021 | CPS | $990 $2.4/sale | $0 |
| ☑ | | Healthy15006475 | Programmatic | Row | ① | 3 | 0 | 01/28/2021 | 01/19/2021 | CPS | $990 $1.8/sale | $0 |
| ☑ | Ended | 14837160 | Programmatic | Row | ① | 38 | 10 | 01/20/2021 | 01/30/2021 | CPS | $990 $3.0/sale | $30 |
| ☐ | - | 14832752 | Programmatic | Row | ① | 4 | 6 | 01/20/2021 | 01/30/2021 | CPS | $990 $3.0/sale | $18 |
| ☐ | - | 14619488 | Programmatic | Row | ① | 93 | - | 01/02/2021 | 01/24/2021 | CPM | $999 Daily | $1.12 |

20 —
Sign out

Type ● Programmatic ○ Priority
Model ● CPM ○ CPS
Unit ● Banner ○ Row
Banner image for desktop (728 x 90 px)
[Choose File] No file chosen
Banner image for mobile (320x100px)
[Choose File] No file chosen
Targeted states
▼
Start date (00:00 PT) End date (23:59 PT)
[mm/dd/yyyy] 📅 [mm/dd/yyyy] 📅
Daily budget
[USD]
Submitted by
[Name]
[Reset]      [Create]

— 32

— 38

FIG. 2

*(20)*

Type ● Programmatic ○ Priority
Model ● CPM ○ CPS
Unit ● Banner ○ Row
Banner image for desktop (728 x 90 px)
[Choose File] No file chosen
Banner image for mobile (320x100px)
[Choose File] No file chosen
Targeted states [▶]
Start date (00:00 PT)   End date (23:59 PT)
[mm/dd/yyyy 🗓]           [mm/dd/yyyy 🗓]
Daily budget
[USD]
Submitted by
[Name]
[Reset]   [Create]

*{34}*

FIG. 3

*(22)*

Type ● Programmatic ○ Priority
Model ● CPM ○ CPS
Unit ○ Banner ● Row
Targeted states [▶]
Start date (00:00 PT)   End date (23:59 PT)
[mm/dd/yyyy 🗓]           [mm/dd/yyyy 🗓]
Daily budget
[USD]
Submitted by
[Name]
[Reset]   [Create]

FIG. 4

Type ● Programmatic ○ Priority
Model ○ CPM ● CPS
Unit ● Banner ○ Row
Banner image for desktop (728 x 90 px)
[Choose File] No file chosen
Banner image for mobile (320x100px)
[Choose File] No file chosen
Targeted states ▶
Start date (00:00 PT)   End date (23:59 PT)
[mm/dd/yyyy 🗓]   [mm/dd/yyyy 🗓]
Daily budget   Bid
[USD]   [USD per sale]
Submitted by
[Name]
[Reset]   [Create]

24

FIG. 5

Type ● Programmatic ○ Priority
Model ○ CPM ● CPS
Unit ○ Banner ● Row
Targeted states ▶
Start date (00:00 PT)   End date (23:59 PT)
[mm/dd/yyyy 🗓]   [mm/dd/yyyy 🗓]
Daily budget   Bid
[USD]   [USD per sale]
Submitted by
[Name]
[Reset]   [Create]

26

FIG. 6

Type ○ Programmatic ● Priority
Model ● Flat
Unit ● Banner ○ Row
Banner image for desktop (728 x 90 px)
[Choose File] No file chosen
Banner image for mobile (320x100px)
[Choose File] No file chosen
Targeted states ▼
Start date (00:00 PT)  End date (23:59 PT)
[mm/dd/yyyy 🗓]  [mm/dd/yyyy 🗓]
Total budget
[USD]
Submitted by
[Name]
[Reset]  [Create]

— 28

FIG. 7

Type ○ Programmatic ● Priority
Model ● Flat
Unit ○ Banner ● Row
Targeted states ▼
Start date (00:00 PT)  End date (23:59 PT)
[mm/dd/yyyy 🗓]  [mm/dd/yyyy 🗓]
Total budget
[USD]
Submitted by
[Name]
[Reset]  [Create]

— 30

FIG. 8A

| 2,353 Saw Ad - Conversions | 358k Ad Impressions | 112k Users Impressed | 140 Participating Stores | $4.3k Ad Spending | 4,855 Saw Ad - Units Sold |
|---|---|---|---|---|---|
| $82.1k Saw Ad - GMV | $19 Saw Ad - GMV / $1 Spent | 2.1% Conversion - Saw Ad | 0.48% Conversion - Didn't See Ad | $53.8k Sales Uplift | $12.40 Sales Uplift / $1 Spent |

Saw Ad GMV - Monthly Growth

| MONTH | SAW AD GMV | MONTHLY GROWTH |
|---|---|---|
| Feb '21 | $4,285 | |
| Jan '21 | $82,356 | -15.4% |
| Dec '20 | $97,379 | 62.5% |
| Nov '20 | $59,925 | 510.3% |
| Sep '20 | $9,820 | -56.3% |
| Aug '20 | $22,488 | |
| Jul '20 | $0 | |
| Jun '20 | $0 | |
| May '20 | $0 | |
| Apr '20 | $0 | |

Participating Stores

| STORE NAME | STATE | IN STOCK |
|---|---|---|
| Store 1 | Colorado | Yes |
| Store 10 | California | Yes |
| Store 108 | California | Yes |
| Store 109 | California | Yes |
| Store 11 | California | Yes |
| Store 110 | California | Yes |
| Store 111 | California | Yes |
| Store 112 | California | Yes |
| Store 114 | California | Yes |
| Store 115 | California | Yes |

Impressions & Users by Store/Date

| BRAND | STORE | MONTH | SAW AD (# OF USERS) | IMPRESSIONS | ADS SPENDING |
|---|---|---|---|---|---|
| Brand 1 | Store 1 | Jan 2021 | 65 | 141 | $1.69 |
| Brand 1 | Store 2 | Jan 2021 | 1 | 2 | $0.02 |
| Brand 1 | Store 3 | Jan 2021 | 1 | 10 | $0.12 |
| Brand 1 | Store 4 | Jan 2021 | 3 | 4 | $0.05 |
| Brand 1 | Store 5 | Jan 2021 | 5 | 8 | $0.10 |
| Brand 1 | Store 7 | Jan 2021 | 2 | 4 | $0.05 |
| Brand 1 | Store 9 | Jan 2021 | 1 | 1 | $0.01 |
| Brand 1 | Store 10 | Jan 2021 | 1 | 1 | $0.01 |
| Brand 1 | Store 14 | Jan 2021 | 10 | 19 | $0.23 |
| Brand 1 | Store 15 | Jan 2021 | 1 | 2 | $0.02 |
| Brand 1 | Store 16 | Jan 2021 | 3 | 5 | $0.06 |
| Brand 1 | Store 17 | Jan 2021 | 1 | 2 | $0.02 |

Conversion & GMV by Store/Date

| BRAND | STORE | MONTH | SAW AD + CONVERTED | SAW AD CONVERSION | DIDNT SEE AD CONVERSION | SAW AD GMV ($) | UPLIFT | UPLIFT/$1 SPENT | PREDICTED UPLIFT |
|---|---|---|---|---|---|---|---|---|---|
| Brand 1 | Store 97 | Jan 2021 | 1 | 2.04% | 0.00% | $98 | $98 | $69.50 | $113 |
| Brand 1 | Store 1 | Jan 2021 | 1 | 1.54% | 0.00% | $48 | $48 | $28.37 | $58 |
| Brand 1 | Store 90 | Jan 2021 | 1 | 0.81% | 0.37% | $100 | $83 | $21.38 | $123 |
| Brand 1 | Store 108 | Jan 2021 | 1 | 0.83% | 0.00% | $60 | $60 | $20.33 | $83 |
| Brand 1 | Store 89 | Jan 2021 | 42 | 2.37% | 1.86% | $2,858 | $549 | $7.55 | $929 |
| Brand 1 | Store 109 | Jan 2021 | 6 | 1.36% | 0.68% | $300 | $85 | $6.43 | $157 |
| Brand 1 | Store 110 | Jan 2021 | 1 | 0.43% | 0.20% | $30 | $2 | $0.30 | $25 |
| Brand 1 | Store 2 | Jan 2021 | 0 | 0.00% | 0.00% | $0 | $0 | $0.00 | |
| Brand 1 | Store 3 | Jan 2021 | 0 | 0.00% | 0.00% | $0 | $0 | $0.00 | |
| Brand 1 | Store 4 | Jan 2021 | 0 | 0.00% | 0.00% | $0 | $0 | $0.00 | $0 |
| Brand 1 | Store 5 | Jan 2021 | 0 | 0.00% | 0.00% | $0 | $0 | $0.00 | $1 |
| Brand 1 | Store 7 | Jan 2021 | 0 | 0.00% | 0.00% | $0 | $0 | $0.00 | |

CATEGORIES
✓ All
  Hot Tickets (40)
  Budtender Approved (4)
> Vape (70)
> Flower (50)
> Edible (139)
> Extract (50)
> Pre-roll (46)
> Merch (38)
> Tincture (34)
> Topical (20)
> Gear (13)
> Grow (7)

CUSTOMER REVIEWS
✓ All
★★★★★ 4+
★★★★☆ 3+
★★★☆☆ 2+
★★☆☆☆ 1+

HOT TICKETS

40 Items | See All

| 20% OFF | 20% OFF | 20% OFF | 20% OFF | 20% OFF |
|---|---|---|---|---|
| Sativa Dominant Jack Rabbit Budlets Jetfuel Cannabis BUDLETS (3.5G) THC 30% | Indica Dominant Master Kush Budlets Jetfuel Cannabis FLOWER (3.5G) THC 18.3% | Indica Dominant Mendo Breath Jetfuel Cannabis ★★★★☆ 17 FLOWER (3.5G) THC 18.2% | Indica Dominant Pure Kush Budlets Jetfuel Cannabis FLOWER (3.5G) THC 17.9% | Indica Dominant Tahoe OG Jetfuel Cannabis BUDLETS (3.5G, 14G) THC 24.6% |
| $25.00 $20.00/3.5G | $25.00 $20.00/3.5G | $45.50 $36.40/3.5G | $25.00 $20.00/3.5G | $25.00 $20.00/3.5G |
| Add to cart | Add to cart | Add to cart | Add to cart | Add to cart |

FIG. 11B

INTERMEDIARY TECHNOLOGY FOR ONLINE MARKETING

CROSS REFERENCE TO RELATED APPLICATION

This application is a continuation of U.S. patent application Ser. No. 17/237,502, filed on Apr. 22, 2021, which claims priority to U.S. Provisional Patent Application No. 63/153,100, filed on Feb. 24, 2021, pursuant to 35 USC § 119. The content of the applications are herein incorporated by reference in its entirety.

BACKGROUND

This description relates to an intermediary technology for online marketing.

Advertising Distribution Channels

As part of its marketing efforts to increase sales and build consumer loyalty, a brand of consumer products typically places advertisements through advertising distribution channels. The brand's objective is usually to deliver multiple impressions of a marketing message to a large number of target consumers across a broad geography and over an extended time period. A few examples of advertising distribution channels are cable television, billboards, in-store audio advertising, and an array of online advertising distribution channels, such as email, social networks, and online retailers.

ROI

Because intensive advertising and marketing campaigns are expensive, the advertising distribution channels are chosen carefully. A brand can evaluate the relative values of respective advertising distribution channels by metrics such as advertising return-on-investment (ROI). One way to calculate ROI is by comparing the money spent for placement of advertisements to the number of impressions made by those advertisements on the target consumers or other metrics. Advertising distribution channels vary widely in their ROIs.

Focused Sites

An example of an online advertising distribution channel having modest ROI is a site that is focused on a limited subject or is aimed at a narrow audience. Advertisements may be placed on such sites by brand advertisers whose products relate to the corresponding subject focus or the narrow audience. For example, on a page containing a story about the benefits of exercise, the American Association of Retired Persons (AARP) site may place an advertisement provided by a life insurance company. Clicking on the advertisement takes the consumer to the life insurance company (brand) site. The clicking by consumers represents impressions that can be counted by the brand as part of the ROI. The placement of such advertisements may yield a relatively low ROI because the target audience is small and the consumer may be paying attention to the exercise story and not be interested in going to the insurance company's site.

Search Sites

One of the most popular advertising distribution channels for brands, and one with a high ROI, is Google Ads. To use this advertising distribution channel, a brand advertiser pays Google Ads a fee for each time a Google user clicks on a placed advertisement on one of Google's platforms, such as Google Search. To improve the number of clicks for a given advertisement placement, Google manages which advertisements are placed, when they are placed, and where they are placed. Google's selections, which are based on Google's knowledge of each consumer's online activities and characteristics, and other factors, are aimed at increasing the number of times consumers click on the advertisements. Typically Google places advertisements in a manner to target large numbers of consumers across broad geographies. When a consumer clicks on a brand advertisement, the consumer is transferred to the site of the brand where the consumer might buy one of the brand's products. The choices made in the placement of the advertisements are controlled by Google rather than by the brand. And Google generally does not share with the brand the information, known to Google, about who the consumer is or how the consumer reached the page where the advertisement appeared and clicked on it.

Social Network Sites

Another high-ROI advertising distribution channel is Facebook. Facebook is able to glean personal information about individual consumers by observing their posts, navigation, likes, and other activities that occur in the course of their using the social networking site. This captured personal information provides an effective foundation for personalization of the placement of advertisements for each consumer who uses Facebook. In placing an advertisement, the brand can provide input to Facebook to be used in controlling choices about where and when and to which consumers the advertisement is presented. For example, when a shoe brand places an advertisement for one of its boot products, the brand can tell Facebook the characteristics of the consumers that it wants to reach, such as men older than 60 who are interested in sports cars and have looked for boots when navigating the Facebook site. Such personalization, partly controlled by the brand and built on the personal information known to Facebook, can yield a robust number of clicks by the consumers and a high ROI for the brand. However, because Facebook is a social media platform, consumers who are using Facebook are, of course, engaged in social activities. Therefore although Facebook can tell a brand that an advertisement will be placed in the stream of posts seen only by consumers who meet the personalization criteria, Facebook cannot assure the brand that those consumers will be interested in clicking at times when they are concentrating on social activities nor that if they click they are likely to buy a product at the site to which they are taken.

Comprehensive Retail Sites

Another online advertising distribution channel with a high ROI for brands is Amazon. Amazon has an advantage in serving brand advertisers because its core business of selling products directly to consumers generates a large amount of detailed data about each consumer and the details of the consumer's transactions and search and navigation activities. Based on this stored information, Amazon can plan (and enable brands to participate in the planning of) advertisement placements that are especially effective. For example, Amazon can present the brand advertisements only to consumers who are known or inferred to be good targets and who meet placement data set by the brands. Amazon can present the advertisements at times when the selected consumers are known to be engaged in the activity of greatest interest to the brands-shopping and buying products—and when the consumer is likely to have an intent to buy. In some cases, the advertisements can be directed to consumers who are actively shopping for and are likely to buy products of the brand that is placing the advertisements. Because of the vast array of brands and products offered on Amazon, a broad range of brands can benefit from placing advertisements on Amazon. Amazon also may give retailers access to custom storefronts that are controlled and hosted by Amazon. In addition, Amazon may present brand advertisements on its site and has access to transaction data related to the branded products sold through the storefronts, but Amazon does not place brand advertisements on independent retailer sites. Therefore the brands cannot take advantage of consumer loyalty to or affinity for those retail storefronts.

Brand Equity

For a brand to maintain and build brand equity requires that the brand have detailed knowledge about the consumers who buy its products and when and why and under what circumstances they buy the products of the brand.

When a brand places advertisements on individual online retail sites, the brand can benefit from being able to capture information about the activities and details about any purchase transactions made on the brand's online site by consumers who "click through". A brand strategy of using advertisements placed on a large number of individual independent online retail sites to cover a market would be appealing but generally is not workable because of the cost, effort, and time required to build and maintain individual relationships with the respective online retail sites. Also in such circumstances, when the consumer clicks through to the brand's online site, the originating online retail site loses its interaction with the consumer. As a result, the online retail site may lose the chance to sell products to that consumer and the opportunity to capture information about the consumer and any transactions that might have been made on the originating online retail site.

When an online consumer buys a product of the brand on an online retail site in a context in which the brand captures no information about the consumer and no details about the transaction, the brand is disadvantaged.

Retailer Site Catalogs

A typical feature of an online retail site is its catalog of retail products (including branded products) that it presents to consumers and offers for sale, often as a gallery of products for sale. Large comprehensive sites usually maintain and present their own catalogs. For specialty retailers (including retailers having physical retail locations), maintaining an up-to-date online catalog of retail products currently available in inventory can be difficult, time consuming, and expensive.

Propensity Data

Said another way, data captured about activities of consumers at online sites (browsing, navigation, clicks, time spent, and other activities, and details about transactions in products, including branded products) is valuable both to the retail online sites and to the brands. We sometimes refer to such data (and other data) as propensity data because it can be directly or implicitly indicative of the propensities of the consumer, for example, the consumer's potential interest in buying a particular product or products of a particular brand. The sites that are able to capture propensity data derive an advantage by not sharing the propensity data with other parties, because it can be used, for example, in making profitable choices about placement of online advertisements and a variety of other business decisions. For that reason, sites are typically reluctant to share the propensity data with other parties including brands. Propensity data captured from online retail sites can be more useful for advertisement placement than propensity data captured on search sites or social networking sites.

To summarize, existing advertising distribution channels for online advertising offered by comprehensive retail sites have limited value for brands, for retailers including specialty physical and online retailers, or for consumers who may want to find specialty brand products and to buy them from specialty retailers to whom they are loyal (the "loyalty factor").

Brands often are not able to assert adequate control over the placement of the advertisements on comprehensive sites (such as search, social networking, and comprehensive retail sites). In addition, because such sites often have substantial self-interest in using valuable propensity data that would also be useful to the brands in maintaining and building brand equity—the sites are often unwilling to share that information with the brands. Also, the sites do not enable the brands to effectively reach large numbers of physical retail locations and specialty online retail sites.

Retailers, especially specialty physical and online retailers, can sometimes operate online retailer storefronts on broad-based sites.

SUMMARY

In general, in an aspect, inventory data is received identifying products that are in inventory and available for sale at a first online retail site. At least one of the products is a product of a brand. Inventory data is received identifying products that are in inventory and available for sale at a second online retail site. At least one of the products is a product of the brand. The first online retail site is controlled independently of the second retail site. Criteria are received from the brand for placement of a marketing device on at least one of the first online retail site and the second online retail site. The marketing device promotes the brand or a product of the brand. The marketing device is served for presentation on the first online retail site if a product of the brand is in inventory and available for sale at the first online retail site and if the criteria for placement of the marketing device are met. The marketing device is served for presentation on the second online retail site if a product of the brand is in inventory and available for sale at the second online retail site and if the criteria for placement of the marketing device are met.

Implementations may include one or a combination of two or more of the following features. Data is received from at least one of the first online retail site and the second online retail site indicative of a conversion event associated with the placement of the marketing device. The conversion event includes a consumer buying a product of the brand. The criteria for placement of the marketing device are based on current actions of a consumer on the first online retail site or the second online retail site. The criteria for placement of the marketing device are based on past actions of a consumer on the first online retail site or the second online retail site. The criteria for placement of the marketing device are based on propensity data for a consumer. The criteria for placement of the marketing device are expressed in at least one of geographic, demographic, or temporal terms. The marketing device includes an advertisement. A charge is applied to the brand for the presentation of the marketing device and a corresponding conversion on at least one of the first online retail site and the second online retail site. A credit is applied to at least one of the first online retail site and the second online retail site for the presentation of the marketing device. A product gallery is served as part of a page from an external server to the first online retail site. The product gallery presents products that are in inventory and available for sale at the first online retail site. The gallery is based on the received inventory data. The marketing device is served as part of the page from the external server. Brand analytical data is based on at least one of the inventory data, the placement data, and the presentation of the marketing device on at least one of the first online retail site and the second online retail site. The marketing device to be served is selected from a pool of marketing devices. The activities of the method are also performed with respect to at least one other brand. The products include specialty products. At least one of the first online retail site and the second online retail site is associated with a physical retail store.

In general, in an aspect, advertisements are received for brands or products of brands. Criteria for placement of the advertisements are received at online retail sites. The online retail sites are controlled independently from one another. Inventory data for the products at the online retail sites is received and stored. Data about propensities of the consumers to favor one or more of the brands or one or more products of the brands, from activities of consumers on the online retail sites, is stored. Activity data about current activities of the consumers on the online retail sites is received. One or more of the advertisements are placed on pages served to the online retail sites based on the placement data, the inventory data, the propensity data, and the activity data. Conversion data is received indicating that consumers engaged in conversion events with respect to products associated with the brands or products of brands being advertised. The brands are charged based on the placing of the advertisements and the conversion events. The online retail sites are paid for the placing of the advertisements and the conversion events.

Implementations may include one or a combination of two or more of the following features. The products include specialty products. The advertisements include banner advertisements or row advertisements. The conversion events include the consumers buying the products. The analytical data is provided to the brands and the online retail sites based on at least one of the placement data, the activity data, the conversion data, the inventory data, and the propensity data.

In general, in an aspect, inventory data is received identifying products that are in inventory and available for sale at a first online retail site and current prices at which the products are available for sale. At least one of the products is a product of a brand. Inventory data is received identifying products that are in inventory and available for sale at a second online retail site and current prices at which the products are available for sale. At least one of the products is a product of the brand. The first online retail site is controlled independently of the second retail site. A component of a page of an online site of the brand is served to or on behalf of the brand. The component presents a product of the brand that is in inventory at both of the first online retail site and the second online retail site and the current prices at which the product is available for sale at the first online retail site and the second online retail site. The component enables a consumer to buy the product at either of the first online retail site or the second online retail site directly from the brand site. Criteria are received from the brand for placement of a marketing device on at least one of the first online retail site and the second online retail site. The marketing device promotes the brand or a product of the brand. The marketing device is served for presentation on the first online retail site when the product is in inventory and available for sale at the first online retail site and if the criteria for placement of the marketing device are met. The marketing device is served for presentation on the second online retail site when the product of the brand is in inventory and available for sale at the second online retail site and if the criteria for placement of the marketing device are met.

Implementations may include one or a combination of two or more of the following features. Data is received from at least one of the first online retail site and the second online retail site indicative of a conversion event associated with the placement of the marketing device. The conversion event includes a consumer buying a product of the brand. The criteria for placement of the marketing device are based on current actions of a consumer on the first online retail site or the second online retail site. The criteria for placement of the marketing device are based on past actions of a consumer on the first online retail site or the second online retail site. The criteria for placement of the marketing device are based on propensity data for a consumer. The criteria for placement of the marketing device are expressed in at least one of geographic, demographic, or temporal terms. The marketing device includes an advertisement. A charge is applied to the brand for the presentation of the marketing device and a corresponding conversion on at least one of the first online retail site and the second online retail site. A credit is applied to at least one of the first online retail site and the second online retail site for the presentation of the marketing device. A product gallery is served from an external server to the first online retail site. The product gallery presents products that are in inventory and available for sale at the first online retail site. The gallery is based on the received inventory data. The marketing device is served as part of the page from the external server. Analytical data is provided to the brand based on at least one of the inventory data, the placement data, and the presentation of the marketing device on at least one of the first online retail site and the second online retail site. The activities of the method are performed with respect to at least one other brand. Analytical data is provided to the brand and the online retail sites based on at least one of the placement data and the inventory data.

In general, in an aspect, inventory data is received identifying products that are in inventory and available for sale at a first online retail site and current prices at which the products are available for sale. At least one of the products is a product of a brand. Inventory data is received identifying products that are in inventory and available for sale at a second online retail site and current prices at which the products are available for sale. At least one of the products is a product of the brand. The first online retail site is controlled independently of the second retail site. The inventory data and current prices for the first online retail site and the second online retail site are provided to the brand.

Implementations may include one or a combination of two or more of the following features. The products include specialty products. The in which providing the inventory data and current prices includes refraining from providing identities of the first online retail site and the second online retail site to the brand.

In general, in an aspect, advertisements are received for brands or products of brands. Criteria for placement of the advertisements at online retail sites are received. The online retail sites are controlled independently from one another. Inventory data for the products at the online retail sites is received and stored. Data about propensities of the consumers to favor one or more of the brands or one or more products of the brands, from activities of consumers on the online retail sites, is stored. Activity data is received about current activities of the consumers on the online retail sites. One or more of the advertisements are placed on pages served to the online retail sites based on the placement data, the inventory data, the propensity data, and the activity data. Conversion data is received indicating that consumers engaged in conversion events with respect to products associated with the brands or products of brands being advertised. Analytics data is derived from at least one of the placement data, the inventory data, the propensities data, the placement of the advertisements, and the activity data. The analytics data is provided to one or more of the brands or the online retail sites.

Implementations may include one or a combination of two or more of the following features. The products include specialty products. The advertisements include banner advertisements or row advertisements. The conversion events include the consumers buying the products. Analytical data is provided to the brands and the online retail sites based on at least one of the placement data, the activity data, the conversion data, transaction data, the inventory data, and the propensity data.

In general, in an aspect, inventory data identifying products that are in inventory and available for sale at a first online retail site is sent to an external server. At least one of the products is a product of a brand. The first online retail site is controlled independently of a second retail site that sends to the external server inventory data identifying products that are in inventory and available for sale at the second online retail site. At least one of the products is a product of the brand. At the first online site, a marketing device is received from the external server for the product of the brand. The marketing device is presented on the first online retail site when the product of the brand is in inventory and available for sale at the first online retail site and when criteria for placement of the marketing device specified by the brand are met. The marketing device is also presented on the second online retail site.

Implementations may include one or a combination of two or more of the following features. Data is sent from the first online retail site indicative of a conversion event associated with the placement of the marketing device. The conversion event includes a consumer buying a product of the brand. A product gallery is presented, at the first online retail site, as part of a page received from an external server. The product gallery presents products that are in inventory and available for sale at the first online retail site. The gallery is based on the received inventory data. The marketing device is presented as part of the page from the external server.

In general, in an aspect, current inventory data is received identifying products in stock and available for sale at an online retail site. Propensity data is received representing propensities of consumers with respect to the products for sale based on activities of the consumers on the online retail site. A page of the online retail site is served. The page contains presentations of the products for sale. The presentation for each of the products has a corresponding prominence in the served page. The prominence of the presentation for a given product is based on the propensities of a consumer who is using the online retail site on which the page is to be served.

Implementations may include one or a combination of two or more of the following features. The propensity data represents interests of the consumers in brands or products of brands. The presentations of the products for sale are elements of a gallery of products. The prominence of the presentation includes at least one of a position, a size, a color, or a graphical element.

These and other aspects, features, implementations, and advantages (a) can be expressed as methods, apparatus, systems, components, program products, business methods, means or steps for performing functions, and in other ways, and (b) will become apparent from the following description and from the claims.

DESCRIPTION

FIGS. 1 through 7, 8A, 8B, 9, 10, 11A, and 11B are views of user interface pages.

FIGS. 12 through 14, 15A, 15B, and 15C are flow diagrams.

INTERMEDIARY TECHNOLOGY FOR ONLINE MARKETING

Here we describe an intermediary technology for online marketing (which we sometimes call simply an "intermediary technology" or an "intermediary technology") that operates between and can provide substantial advantages to all kinds of advertisers (and their representatives). The intermediary technology also provides substantial advantages to commercial entities that operate all kinds of online commerce sites on which commercial items associated with the advertisers are made available for commercial transactions with consumers and on which advertisements for the commercial items can be presented to consumers. In some respects the intermediary technology serves as an advertisement distribution channel through which advertisers can place advertisements on online commerce sites. In some implementations, the intermediary technology can be operated or hosted independently of any of the advertisers or any of online commerce sites.

Although the intermediary technology can usefully serve a small number of advertisers (as few as one advertiser) or a small number of such commercial entities (as few as one), in many implementations, the intermediary technology is configured to serve many advertisers (dozens or hundreds) and a very large number of such commercial entities (hundreds or thousands, for example). In some configurations, an advertiser can place advertisements on a very large number of online commerce sites through the intermediary technology and without having to establish or maintain direct relationships with any of the online commerce sites. In addition, the intermediary technology can acquire and make available to the advertisers detailed inventory data about products that are in inventory and available to be sold to consumers from online commerce sites, propensity data and other activity data about consumers, and transaction data from the online commercial sites, among other kinds of information. Because the intermediary technology can process the data to hide or eliminate confidential information of the online commerce sites before presenting the data to the advertisers, and because the intermediary technology does not itself operate as an advertiser or as an online commerce site, the intermediary can act as and be viewed as a trusted honest broker for such information with respect to both the advertisers and the online commerce sites.

In effect, the intermediary technology can serve as a publishing network for advertisements and other marketing devices spanning large numbers of online retail sites for a wide range of markets.

The Brand Advertiser and Specialty Retailers Examples

In much of the discussion below, we use, as an example an intermediary technology configured to serve dozens or hundreds of advertisers that are, in this case, consumer product brands and dozens or hundreds or thousands of commercial entities that are retailers that present online retail sites (and may also have physical retail locations) where brand products are offered for sale to consumers. Implementations of the intermediary technology can also be used in a wide variety of other contexts and applications in which the advertisers are not consumer product brands and the commercial entities are not online retail sites.

In some parts or our discussion, we use the particular example of retailers that are specialty retailers, although the intermediary technology is applicable to all kinds of retailers in addition to specialty retailers. Specialty retailers may be owned and operated independently of large commercial retailers, may be relatively small, may operate physical retail locations (brick-and-mortar stores), may sell specific types of products and brands, and may provide special and personal services that significantly enhance the loyalty of its consumers. Typically brands do not establish and maintain direct relationships with large numbers of specialty retailers.

Although we sometimes refer to advertisements as examples, the intermediary technology is applicable to a wide range of marketing devices that can be presented through an online retail site.

"Shelf-Space"

In typical physical retail stores, such as grocery stores, the placement of various consumer products on shelves and along aisles and the amount of space occupied by products is often governed at least in part by fees paid by brands to the physical retail stores to command prime shelf locations and extensive shelf space. Once the shelf locations and amount of shelf space are set, they may not be changed for long periods of time such as weeks or months. As a result, consumers who are shopping in the physical retail stores are presented with products arranged in ways that don't necessarily reflect their interests or propensities. The consumers therefore may find it hard to locate products of interest. In addition, consumers have different interests. The shelf arrangement that would be most convenient for one consumer would inevitably be different from the shelf arrangements that would be ideal for other consumers. Yet, the physical retail stores cannot instantly change the shelf arrangement to accommodate each different consumer who may walk down the aisles next.

The intermediary technology, by contrast, receives, stores, and can analyze propensity data for each consumer who visits each online retail site (e.g., each specialty online retail site). The intermediary technology therefore can infer the products that would be of greatest interest for that consumer and the arrangement of those products in, for example, a gallery presented on the pages of the online retail site that would be most useful to that consumer. In some implementations, the intermediary technology controls the organization, serving, and presentation of the gallery of products on each online retail site. The control can be based in part on the propensity data analyzed by the intermediary technology and based on other information such as inventory data. The online retail site may, but is not required, to participate in the control of the organization, serving, or presentation of the gallery. In some instances, the online retail site can rely on the intermediary technology for that function.

The gallery presented on a given online retail site can therefore be customized to serve each particular consumer who is using the online retail site, and can even be changed while a given consumer is engaging in navigation, searching, and other site activities that indicate a shift in interests or preferences. Unlike in physical retail stores, there is no limit to the amount of "shelf space" that can be handled by the intermediary technology nor to the complexity of the arrangement and priority with which products are presented.

The gallery for each different online retail site and for each consumer who is engaged in site activities is organized, served, and presented dynamically and in real time. This arrangement not only makes the consumers' experiences effective and appropriate in each case, it also may yield more sales of products on each of the online retail sites. This process also can proceed simultaneously and in parallel on hundreds or thousands of the online retail sites (for instance, independently operated online retail sites and retail sites that sell specialty goods) as thousands of different consumers engage in site activities on them. As a result the intermediary technology can produce a significant positive impact on consumer experiences and product sales in entire online marketplaces for various categories of products.

In organizing, serving, and presenting galleries of products on online retail sites, the intermediary technology also can respond to and take account of advertisements and other marketing devices submitted by brands or other advertisers for inclusion on the sites. For example, the pages served to the online retail sites can include both galleries configured specifically for consumers who are active on the retail sites and separate advertisements that may trigger interest or purchases by the consumers. In some cases, the advertisements can be embedded directly in the galleries. In some examples, the advertisements can be the dominant factor in the organization of the pages.

In other words, the intermediary technology can mediate to different degrees between the interests of advertisers in having specific advertisements placed on the pages and the value to consumers of seeing products that play to their interests based on propensity data. Of course, because the advertisers want to increase the sales of their products, and consumers may naturally tend to buy products that appeal to their interests, the motivations of advertisers and the propensities of consumers often are not in conflict and can be mediated in a natural way. The intermediary technology can provide that mediation to different degrees implicitly or explicitly.

A given brand or other advertiser can express its goals by placement data that can impact the locations and frequencies of presentations of its products. The advertiser can, for example, specify that it wants its products to be shown only in online retail sites that have the products in stock and only when the consumer has certain demographics or propensities and only when products of competitors are also being presented.

In some cases, the intermediary technology could permit the placement data to affect not only the placement of advertisements, but the organization of products in galleries unrelated to the presentation of associated explicit advertisements.

Therefore, in some cases, a brand or other advertiser may not (or at least, need not) provide any advertisements or other marketing device for placement on the online retail sites. Instead the advertiser or other brand can pay for the intermediary technology to adjust the presentation of a gallery, for example, so that the products of the advertiser are presented in more favorably than would otherwise be the case. The more favorable presentation could be a better position, a larger size, a longer presentation, or presentation using other more favorable graphical techniques. And the timing of the more favorable presentation can be coordinated to occur at a time when the consumer is predisposed to consider and to buy the product.

This approach amounts, by analogy, to the intermediary technology selling prominence in the form of virtual shelf position and shelf space to products of the advertiser. When this approach is used, the intermediary technology can charge the brand based on performance metrics, for example, the number of sales of the product or other products of the brand that are associated with the more prominent placement. Using clickstream data, the intermediary platform can track the consumer's activity on the online retail site, from searching, to being presented an impression based on the adjusted prominence of the presented product, to adding a product to a cart, and then checking out. As a result, the intermediary technology can charge the advertiser based on various advertisement models including CPM (cost per 1000 impressions), CPC (cost per click), or CPS (cost per sale). The intermediary technology can provide evidence for a variety of models because it can show what the consumer saw, clicked on, advertisement purchased.

Basic Functions of the Intermediary Technology

In some examples involving consumer product brands and online retail sites (and also in other examples), the intermediary technology can perform (or manage other parties to perform) at least the following activities and combinations of them:

(a) Inventory data. Access, receive, store, aggregate, analyze, and report inventory data representing in-stock status and availability for sale of brand products offered on online retail sites.

(b) Activities data and other propensity data. Capture, store, aggregate, analyze, and distribute propensity data (including detailed activities data and transaction data) representing consumer online activities on the online retail sites of the specialty retailers, including activities involving products of the brands. Propensity data can, among other things, indicate interest by a consumer in brands, products, categories, and a variety of other matters not necessarily related to products.

(c) Brand information and instructions. Receive, store, and analyze information and instructions (placement data) from brands about marketing devices (for example, advertisements) that the brands wish to be applied to online retail sites of the specialty retailers. Brand information can also include product identifiers, marketing messages, details about marketing campaigns, flights, and a variety of other information.

(d) Marketing devices. Receive, validate, store, and manage marketing devices (e.g., advertisements) to be applied to online retail sites of specialty retailers. Marketing devices include a wide variety of advertisements, marketing messages, promotions, and others.

(e) Advertisement placement decisions. Make advertisement placement decisions including which advertisements should be placed, when, for which brands, and on which online retail sites, among other things, to optimize ROI for the brands based on the propensity data, the inventory data, transactions data, conversions data, impressions data, placement data, and activities data (which we together sometimes refer to, along with other kinds of data used by the intermediary technology as intermediary data).

(f) Serving pages with advertisements. Fetch selected advertisements and place them on online retail sites according to the advertisement placement decisions.

(g) Impressions data, conversions data, and transactions data. Capture, store, aggregate, analyze, and distribute data about advertisement impressions and related conversions (for example, sales of products).

(h) Share data. Organize, aggregate, anonymize, analyze, and share various types and combinations of the intermediary data with brands and with retailers, while respecting the confidentiality of the certain kinds of the intermediary data to the retailers that are the source of the data.

(i) Fees. Collect fees from the brands for applying the marketing devices to the online retail sites, the fees being based on corresponding actions (e.g., conversions) of the consumers or events on the retailer online retail sites.

(j) Split fees. Pay part of the collected fees to the retailers to whose online retail sites the marketing devices were applied, and retain part of the collected fees as compensation for the application of the marketing devices.

(k) Analytics. Process, analyze, model and perform other analytical tasks on various kinds and combinations of intermediary data to generate analytics data (which we consider to be part of the intermediary data) for internal purposes of the intermediary technology, for advertisers, for online retail sites, and for consumers, among others.

Benefits of the Intermediary Technology

In addition to advantages described above and below, the intermediary technology offers a range of advantages and benefits to advertisers, online retail sites, consumers, and other parties.

Advertisers such as brands get access to an intermediary technology through which to place their marketing devices (advertisements, for example) with a large number of online retail sites (e.g., specialty retailers) to which the brands would not normally have easy access because of the effort, time, and money required to build and maintain individual direct relationships with those retailers. The brands and other advertisers also can improve their ROI based on the intermediary technology's application of the marketing devices. Improved ROI can result, because consumers at online retail sites, in particular specialty retailers, not only often have an intent to buy. They also frequently have a strong and durable interest in and loyalty to the specialty retailer and its online retail sites, including those operated by specialty retailers having physical retail locations. In addition, the brands may be given access to propensity data, inventory data of the online retail sites, impressions data, conversions data, clickstream data, brand advertisement metrics, and analytics data and other kinds of intermediary data, all of which can be useful to them in building and maintaining brand equity and enhancing their ROI from advertising, among other things. Brands also can benefit from the intermediary technology's customized dynamic organization of the catalog galleries of the online retail sites, which can produce higher sales of the brands' products.

The technology also provides advantages for retailers. The benefits can include higher sales, better consumer relationships, greater market reach, more brands represented on their online retail sites, and access to propensity data, inventory data, impressions data and conversions data, clickstream data, retailer advertisement metrics, retailer analytics data, and other kinds of intermediary data. The retailers also receive revenue from the application of the marketing devices to their online retail sites. Additionally the retailers can reduce the effort, time, and cost of building and maintaining direct relationships with the brands.

The Products

Although the intermediary technology can be applied to a wide range of types of products, it may be especially effective for kinds of products that consumers tend to or prefer to buy through specialty retailers, including physical specialty retailers that also have online retail sites. Among other qualities, these types of products (which we sometimes call "specialty products") may have one or a combination of two or more of the following characteristics (and others): they may not appeal broadly to a wide range of classes of consumers; they may not be commodities; they may be controlled or regulated (such as *cannabis* products) in a way that limits their desirability for listing on large comprehensive online retail sites; they may be picked up or delivered locally to the interested consumers; they may be offered for sale by physical retailers that are located near the consumers; and they may be hyper-personal (such as products of shoe brands and liquor brands, to name two) in the sense that they are attractive to relatively small audiences of consumers who have specific (and sometimes atypical) tastes and characteristics.

The Brands

Similarly, although the intermediary technology can be useful to all kinds of brands and other advertisers, it may be especially helpful for brands of products having the characteristics described above, for example, specialty products. More broadly, brands and other advertisers that are interested in applying marketing devices to large numbers of online retail sites but have been unable to build and maintain the large number of necessary relationships, may be drawn to use the intermediary technology for advertisement placement.

The Retailers

Again, many categories of retailers and many classes of specialty retailers would be suited to using the intermediary technology for advertisement placement. Among the types of specialty retailers for whom the intermediary technology can have special interest are physical retailers who sell the kinds of products described above and retailers who are able to build and maintain strong relationships with and loyalty of consumers, so that when a consumer is present in a physical retail location or on the specialty retailer site, there is a high likelihood that the consumer will buy a product. For example, *cannabis* outlets and their online retail sites can develop and maintain relationships in which, when the consumer is present in the physical store or on the site, there is a high likelihood of a purchase. Similar consumer relationships can be built by, for example, shoe brands or liquor brands, to name two.

The Intermediary Technology

In some implementations, the intermediary technology can be a specialty intermediary technology serving brands (including competing brands) and specialty retailers (including competing retailers) for specialty products. However, more generally, the intermediary technology is useful in serving every kind of brand or advertiser and every type of retailer. The intermediary technology captures, stores, aggregates, and analyzes a wide variety of intermediary data including inventory data and propensity data and uses the intermediary data for the benefit of the brands and the retailers. The intermediary technology does not sell products, does not display advertisements or engage in applying other marketing devices on its own site, and therefore does not compete with either brands or specialty retailers. For that reason the intermediary technology can be perceived as an honest broker.

Marketing Devices and Generation and Management of Catalogs and Galleries

Marketing devices can include, for example, any kind of media item, advertisement, presentation, link, decision, information, instruction, ranking, placement, process, tool, or other device that is, for instance, designed, configured, or implemented to market brands or products through online sites of retailers. As just two examples, clickable advertisements are marketing devices as are the positions or prominences of products in presentations of product catalogs or product galleries through user interfaces of online retail sites.

For example, a brand of *cannabis* may be willing to pay for *cannabis* online retail sites located in certain geographic regions to place a specific one of the brand's products at the top of the list of products available for sale at the online retail sites according to specified placement instructions, placement criteria, or other placement data. As one example, the placement data could specify placement on weekend days when a consumer who is female and older than 55 is on an online retail site and has searched for the name of that brand, and only if the product is in inventory at the retailer and only when the consumer is a frequent buyer of the brand's products. Then, if such a consumer clicks on the product that has been positioned at the top of the list, she will be taken to a place on the same online retail site where that product can be bought. Her purchase of the product (conversion) will trigger payment by the brand for that positioning of the product advertisement.

A wide variety of placement data can be used including criteria related to time periods, geographic reach, demographics, online context, sequences, activities of consumers, inventories, prices, and many others.

The intermediary technology can allow brands to specify the placement data under which they want their marketing devices (e.g., advertisements) to be applied on retailers' online retail sites, or the intermediary technology can decide on the placement data on behalf of the brand, or a combination of the two can be applied. The specification of placement data by the brand or the intermediary technology or a combination of them can be made based on propensity data and other intermediary data that has been accumulated from the specialty retailer online retail sites. The context for application of the marketing devices can include prominence, frequency, locations, demographics, and a variety of other factors of interest.

The positioning and prominence of products and brands in the presented catalog (gallery) of each of the online retail sites can be dynamically determined by the intermediary technology in real time for each consumer on each online retail site. Because the intermediary technology has access to propensity data for each consumer, to clickstream data or activities data representing activities of the consumer on each online retail site, to the information and instructions from each of the brand advertisers, and to other intermediary data, the decisions about positioning and prominence can be made in a manner to optimize the ROI for one or more brands and one or more products, among other objectives. The retailer benefits from higher sales and stronger loyalty of consumers, the brand benefits from higher sales and higher ROI, and the consumer benefits by being presented quickly and effectively with products and brands that are likely to be of interest.

We sometimes use the word gallery to refer to a mode of presentation of products in which each product is represented by a panel or card or frame and the panels, cards, or frames are arranged in a pattern such as rows and columns.

We use the word "gallery" broadly to include, for example, any device by which products or other elements are organized for presentation through a user interface to consumers. Examples include galleries, arrays, lists, menus, and a wide variety of other techniques.

Technology Details

Interfaces and Data Collection and Reporting

In some implementations, the intermediary technology interacts with advertisers, online retail sites, consumers, and other parties, through pages served through browsers or applications running on devices and presented in user interfaces of the device. Below we describe examples of such interfaces, though a wide variety of other styles and content could be provided. Among other things, the interfaces can be used to capture or collect or to present any one or more of the types of data that are part of the intermediary data.

Brand User Interface

FIGS. 1 through 7, 8A and 8B show user interface screens for a brand user interface served by the intermediary technology from a server of the intermediary technology to a device of a brand advertiser. The brand user interface presents user interface controls and information useful to the brand user, for example, in arranging advertisements for placement through the intermediary technology to online retail sites and in receiving information about the online retail sites and the effectiveness of the placed advertisements, among other things.

In some implementations of the intermediary technology, the brand user can specify advertisements to be placed that are characterized by advertisement type, advertisement model, and advertisement unit.

In the example shown in FIGS. 1 through 7, 8A and 8B, the advertisement types can be either programmatic (in which the timing, location, frequency, and other placement data can be determined algorithmically by the intermediary technology) or priority (in which at least some of the placement data are specified by the brand user in advance). A priority type advertisement is guaranteed to be presented on the first impression available. Advertisements cycle through in this order when consumers are active on a page: Priority>Programmatic>Programmatic>Priority> . . . , with 30-second intervals in between.

The advertisement model refers to the manner in which the cost of placing the advertisement is determined. In this example, the advertisement model can be either cost per thousand impressions (CPM) or cost per sale (CPS). Other models, such as cost per click (CPC), can also be offered.

The advertisement unit refers to the presentation mode and is governed by the advertisement type. For a programmatic type of advertisement, the advertisement unit can be either a banner advertisement which is presented separately from the gallery of products from the catalog and in a different format (such as a full-page-width advertisement) or a row advertisement which is presented separately from the gallery but in a similar style of products of the brand shown in a row. For a priority advertisement type, the advertisement unit is a flat advertisement, that is, an advertisement that conforms to a flat rate model in which a brand pays a flat rate for a specific advertisement submission, rather than, say, CPM or CPS.

The brand user interface presents an advertisement specification panel that enables the brand user to use radio buttons to select the advertisement type, advertisement model, and advertisement unit, and then to provide details for the selected type, model, and unit. In this example, there are six combinations of advertisement type, advertisement model, and advertisement unit corresponding to six versions of the advertisement specification panel 20, 22, 24, 26, 28, and 30 shown in FIGS. 2 through 7 (panel 20 is also shown in FIG. 1).

All versions of the advertisement specification panel include a common section 32 containing controls that enable a brand user to specify details of the advertisement including an advertising time span defined by a start date and an end date, a daily budget of the amount of money that the brand user has budgeted to spend on placements of the advertisement per day, the brand user's name, and controls that can be invoked to reset the panel or to create an advertisement record that will be used by the intermediary technology in implementing the placement of the advertisement.

When the advertisement unit is a banner advertisement, the advertisement specification panel includes a section 34 that enables the brand user to choose local files containing graphical format versions of the banner advertisement with appropriate pixel dimensions for display on a desktop computer and on a mobile device. The brand user also can select targeted states for the banner advertisement. Targeted states are selected states (e.g., Montana or California) in which the advertisement is to be presented.

The section 34 is not presented on versions of the panel configured for row advertisements except that the targeted states selector is presented when the advertisement type is programmatic and a targeted stores selector is presented when the advertisement type is priority (enabling the brand user to specify online retail sites where the advertisement is to be placed). When the advertisement model is CPS, the section 32 of the panel also enables the user to specify a bid price per sale for use by the intermediary technology in managing an auction process with respect to the placement of such advertisements.

In FIG. 1, the versions of the advertisement specification panel are shown as part of an advertisement submission dashboard 36 for the brand user. In the left side of the advertisement submission dashboard a table 38 of details of advertisements is presented selectively either as an elevated extracts tab (shown in FIG. 1) or an all advertisements tab. Each row of the table is a record associated with an advertisement. The fields of the table display, for each row, the active status (active or not), the health status (healthy or ended, for example), the advertisement type, advertisement model, and advertisement unit, the targets, impressions, conversions, start and end of the advertising time span, and the amount billed to the brand advertiser. Healthy and ended refer to the presentation status of an advertisement as provided, for example, from the advertisement server. The presentation status could be, for example, pending, healthy, border line, in danger, finished, and under delivered. The advertisement server takes real-time clickstream data, display periods, advertisement fulfillment status (budgeted, impressed, etc.), and other factors into account to determine whether it can reach a set goal by the end of the displaying period. The end status is provided from the intermediary technology to inform the advertisement server that the advertisement has passed the displaying period.

An analytics process of the intermediary technology can use information about placed advertisements (and other intermediary data) to generate a wide range of analytics data that is useful to a brand advertiser. In the example shown in FIGS. 8A and 8B, a brand analytics dashboard 40 is presented to the brand user to provide a panel 42 of summary information about key brand advertisement metrics of interest to the brand user. Some of the brand advertisement metrics relate to advertisements seen, impressions, conversions, sales, gross merchandise volume (GMV), and stores, as illustrated in the figure. Other panels 44, 46, 48, and 50 present tables of respective brand advertisement metrics. Although not shown in FIGS. 8A and 8B, the brand analytics dashboard can include a variety of controls that would enable the brand user to select the summary brand advertisement metrics shown in panel 42 and the brand advertisement metrics presented in the other panels. In some implementations, the brand user can control the fields displayed in a given panel table.

As suggested by FIGS. 8A and 8B, a variety of data is obtained from the brands in connection with placement of advertisements. The collected data (some of which is not shown explicitly in FIGS. 8A and 8B) can include the following: advertisement type: programmatic or priority, advertisement model: CPS (cost per sale) or CPM (cost per mille), advertisement unit: sponsored row or banner; targeting information: targeted states, targeted online retail sites, new consumers, existing consumers; scheduling: start date, end date; and budget: total budget, daily budget, budget per sale.

Also, a variety of data can be provided to the brands through the interface shown in FIGS. 8A and 8B in connection with placement of advertisements, including some kinds of data illustrated there and a wide variety of others not illustrated. The provided data can include the following: number of advertisement impressions; number of conversions; number of consumers who saw advertisements; number of retail sites that have advertisement "real estate" for the brand; dollar amount spent on advertisements; number of products purchased by consumers who saw the advertisement; GMV (gross merchandising value) of the products purchased; ROI in GMV per $1 spent on advertisements; percent of consumers who purchased a product after the seeing the advertisement (conversion rate); percent of consumers who purchased a product after not seeing the advertisement; the total sales uplift for the brand; and the sales uplift per $1 spent.

Retail User Interface

As with the brand user interface, the retail user interface shown in FIG. 9 can present a wide variety of advertisement metrics relevant to an online retail site managed by a retail user. Using filters and other controls, the retail user can specify and control which retail advertisement metrics are presented and in what manner. The example shown in FIG. 9 presents a retail analytics dashboard. Conversely to the brand user interface where the brand user can see information related to multiple online retail sites where its advertisements are placed, the retail user can see information related to the range of brands whose advertisements have been placed on its online retail site. In the example of FIG. 9, the retail analytics dashboard presents retail advertisement metrics. Among other parameters, the retail advertisement metrics can relate to impressions by brand, conversions by brand, unique products of a brand in stock, and advertisement revenue by brand. Although not illustrated in FIG. 9, the intermediary technology also collects from retail consumers consents to permit the intermediary technology to display advertisements (e.g., a contract), and an accepted revenue share percentage to be paid by the intermediary technology from charges applied to the advertisers.

By virtue of agreement or course of conduct, the intermediary technology has permission and access to collect continually and in real time a wide variety of data about the operations of each of the participating online retail sites. Among other things, in some implementations, the collected data is useful and necessary to support the organization, generation, serving, and presentation on each of the online retail sites of a gallery or other device to show an up-to-date catalog of products (including brand products) that are in inventory and available for sale and the prices of the products (inventory data and pricing data). In effect, the intermediary technology servers as a retail catalog manager for each of the online retail sites. The intermediary technology maintains, manages, hosts, and serves complete pages of the online retail sites or widgets, add-ins, or other devices for incorporation into and presentation on pages of the online retail sites.

In some cases, the look and feel of the catalog can match the look and feel of other aspects and pages of the specialty retailer's site. Although the consumer may therefore interpret the widget or add-in or other device as a seamless part of the online retail site, interaction by the widget or add-in with the consumer (including completion of sale transactions) can be hosted and managed by the retail catalog manager on behalf of the retailer. This arrangement also gives the retail catalog manager access to information about activities of the consumer on the online retail site, details of transactions, and other propensity data. Therefore various kinds of intermediary data become available and are collected by virtue of requests made by the browser or application back to the server of the intermediary technology as a result of consumer activities (for example, searching, navigation, clicking, scrolling, invoking other controls, and other actions) on the pages of the online retail sites.

In addition, as part of hosting and managing the catalog, the retail catalog manager can be given access to real-time up-to-date inventory information for the products in the catalog as maintained in the retailer's inventory system or point-of-sale system. This enables the retail catalog manager to keep the retail catalog current with respect to products actually available for sale.

An example of a system that implements at least some of these features is the system offered to hundreds of specialty online retail sites in the *cannabis* market by Jane Technologies, Inc. at https://www.iheartjane.com/. Certain features of such a system are described in U.S. Pat. No. 9,836,772, issued Dec. 5, 2017, and U.S. Pat. No. 10,664,801, issued May 26, 2020, the entire contents of both of which are incorporated here by reference.

With reference in part to the above cited United States patent, for a variety of purposes, the intermediary technology maintains a transactional database that stores all product and transactional data and provides it, for example, to an analytical database used to determine, among other things, products bought by consumers who have seen advertisements. The analytical database uses at least the following data from the transactional database: the products table; product_id; product_brand_id; menu_products table; store_id; product_id; inventory_count (used to figure out how many units are in stock); cart; cart_id; cart products; product identifier (to determine if the user checked out an advertiser's product); store_ads_settings (used to determine which online retail sites are currently participating in digital merchandising); and menu_products (used to see if a brand's products are in stock at the online retail site).

Consumer Activity Data Collected

During operation of each of the online retail sites and while consumers are engaging in consumer activities on the sites, the intermediary technology has access to and collects a variety of types of data including propensity data that can be specifically associated with each of the consumers. Evidence of the consumer activities is generated in the form of requests from the browser or application and directed to the servers of the intermediary technology. The stream of such requests is sometimes called a clickstream. In some implementations the intermediary technology uses a third party server that can receive the clickstream, process it, and make available clickstream data and propensity data derived from the clickstream data to the intermediary technology. The clickstream data can be associated with specific consumers using cookies and other techniques over a period spanning successive sessions of the consumer using the online retail sites. The propensity data derived by the third-party server and provided to the intermediary technology can be in the form of a propensity profile for each consumer who uses any of the online retail sites.

A propensity profile can contain parameters indicative of the consumer's interest in brands, products, categories, geographies, time periods, and a wide variety of other parameters represented by the clickstream. The propensity profile is useful in controlling placement of advertisements to maximize ROI within the placement data specified by advertisers, and can be useful to advertisers and online retail sites for other purposes.

Information collected from consumer activities and in some cases reported to brands and to online retail sites can include the following: click events, view events, and conversion events: added product to cart (click event), clicked marketplace product card on a brand site (click event), clicked menu product card on a gallery of an online retail site (click event), updated product in cart (click event), added product to cart (conversion event), succeeded in checkout (conversion event), searched menu products (view event), and searched products (view event).

An intermediary technology weighting process assigns a weight to each event, which determines how much the occurrence of that event affects the user's propensity profile. For example, a checkout success event can be weighted to produce a score of 100 while an updated product in cart event can be weighted to produce a score of 10.

Every event in the clickstream carries a payload of facets, which are metadata for the events and signal the consumer's propensities. In some implementations, the following facets are captured in the metadata: brand, category, kind, lowest_price, and root_types.

The combination of clickstream data and facet metadata can be processed to yield the consumer's propensity profile. For example, if a consumer repeatedly checks out (i.e., buys) products of a brand "Select", a category "Indica", and a kind "pre-roll", the intermediary technology can reasonably infer that consumer's propensity profile. Then, when a consumer loads a page of one of the online retail sites, the intermediary technology can use the consumer's propensity profile, and other data, to select the advertisement most likely to result in a checkout conversion.

Data Provided to Retailers

As partly illustrated on FIG. 9, the intermediary technology can provide a wide range of data and other information to retailers based on the collected, stored, and analyzed intermediary data. In some implementations, the information provided to the retailers can include: advertisement impressions by brand, conversion rate by brand, identifiers of participating brands, advertisement impressions and consumers by online retail site and date, average unique products in stock at the online retail sites, a number of consumers who saw an advertisement, the total advertisement impressions, and the retailer's revenue from advertisements, among other things.

Consumer User Interface.

Figure 10:
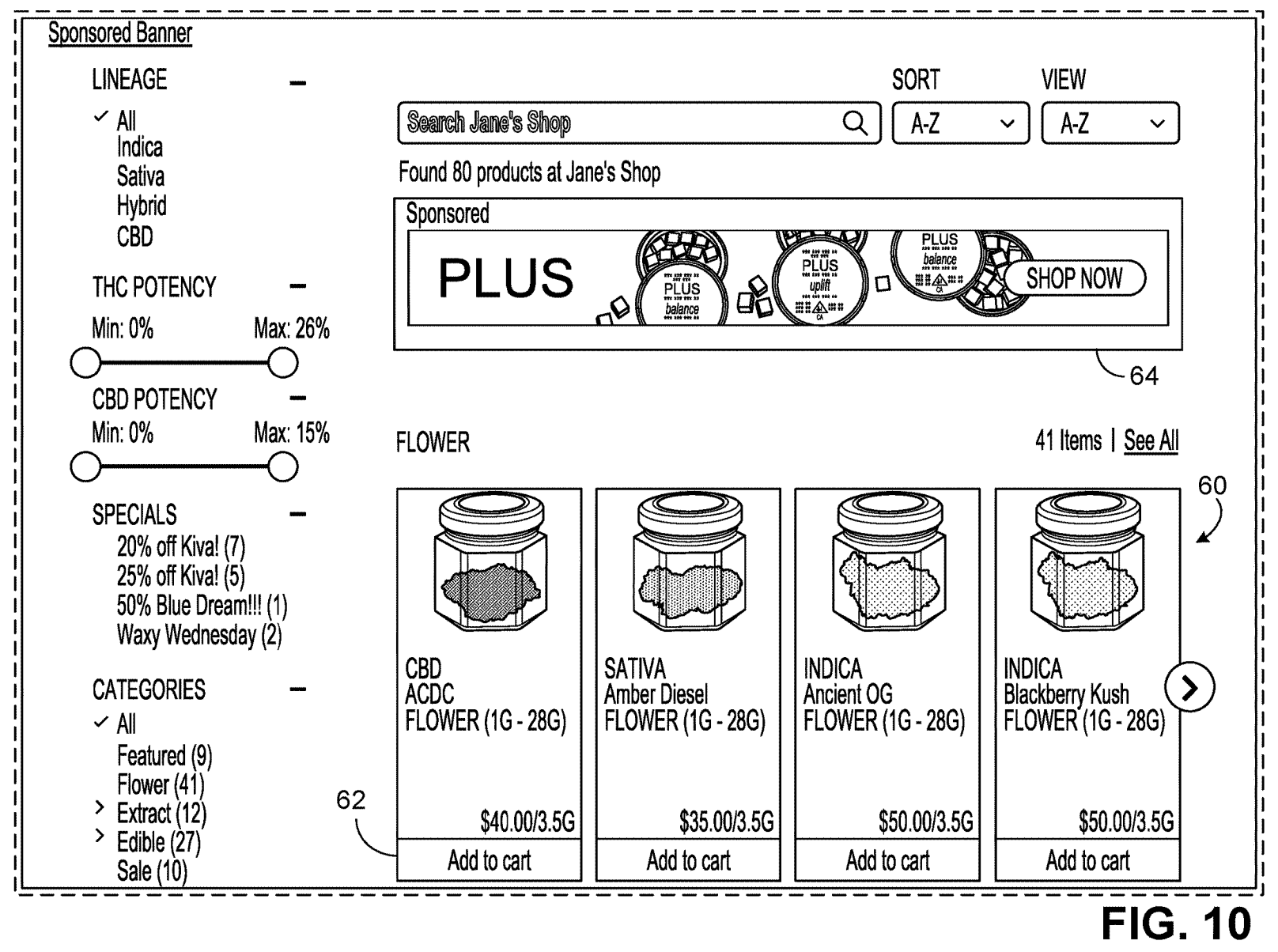
Figure 11A:
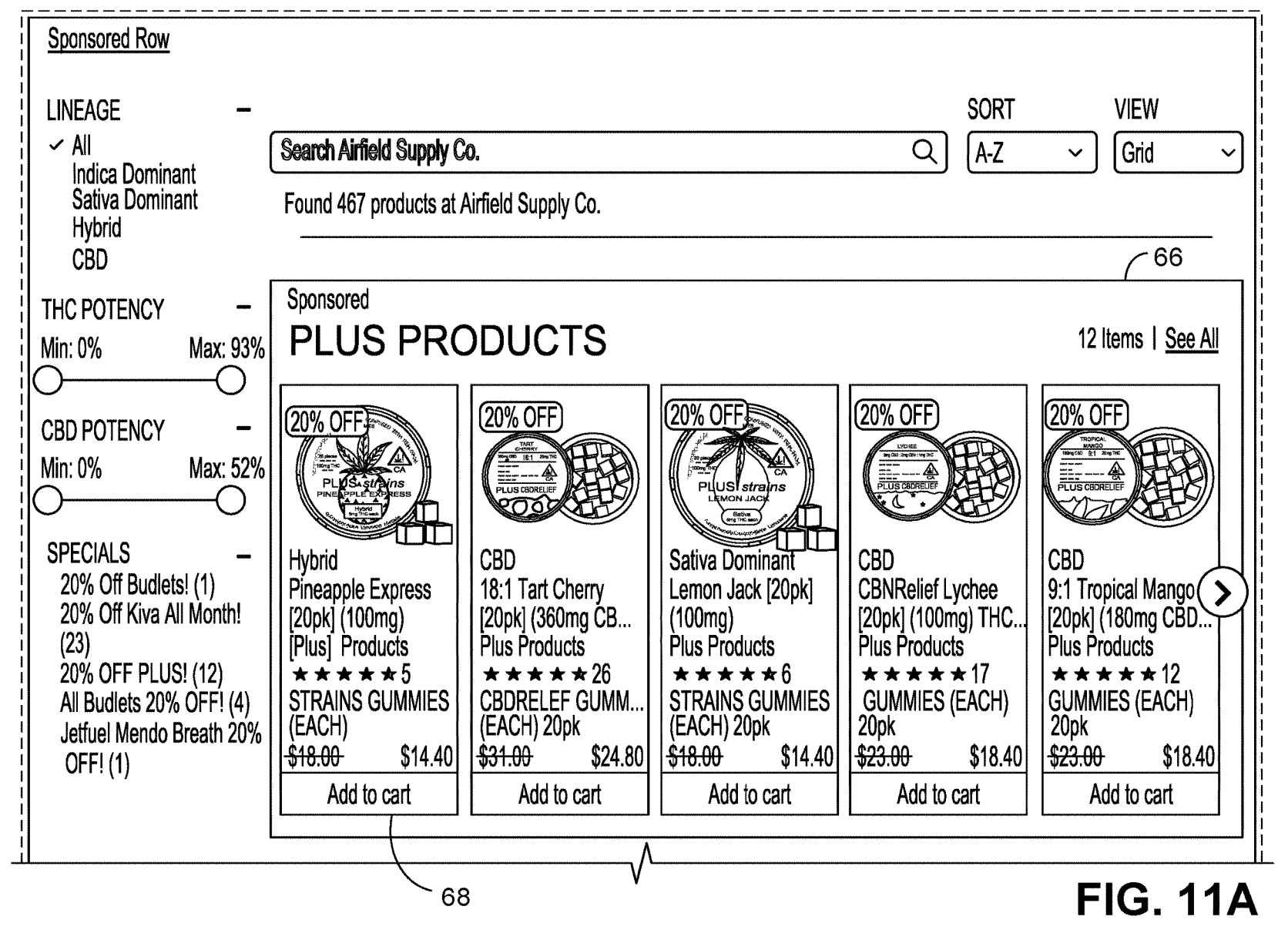

FIGS. 10, 11A, and 11B show examples of a banner advertisement and a row advertisement, respectively, placed on pages served to a retail online site from a server of the intermediary technology. These example consumer user interface pages are for a retail online site selling *cannabis* products.

In FIG. 10, a gallery 60 of product panels or cards 62 is presented of *cannabis* products 64 that are in a catalog of the online retail site and are known (from inventory data) to be in stock and available for sale to consumers using the online retail site. Each of the panels provides information about the product and enables the consumer to add the product to a cart for purchase.

Controls are presented on the page that enable a consumer to filter and navigate the catalog (e.g., in the form of a gallery) to locate products of interest to be shown in the gallery. Near the top of the page, a banner advertisement 64 is presented for a brand of products (in this case the "Plus" brand). If the consumer invokes the banner advertisement, for example by clicking on the shop now button, the gallery is changed to show products of the Plus brand. The display of the banner advertisement can be counted as an impression. If the consumer buys a product of the brand on the online retail site, the purchase can be counted as a conversion.

In FIGS. 11A and 11B, a row advertisement 66 appears near the top of the page. The row advertisement presents a row of panels 68 for products of a brand advertiser in the same manner as the panels presented in the gallery 70. For example, a consumer can invoke any of the panels in the row to add the product directly to a cart.

Processes and Process Flow

The intermediary technology can be implemented on one or more servers operating through the Internet to serve advertisers and retailers. The servers can execute a wide variety of processes to perform the functions discussed above and below, and other functions. Among the processes and the flows of the processes are the following. Some of the processes and flows and their interrelationships are illustrated in FIGS. 12 through 14, and 15A through 15C.

Advertisement Creation Flow

Figure 12:
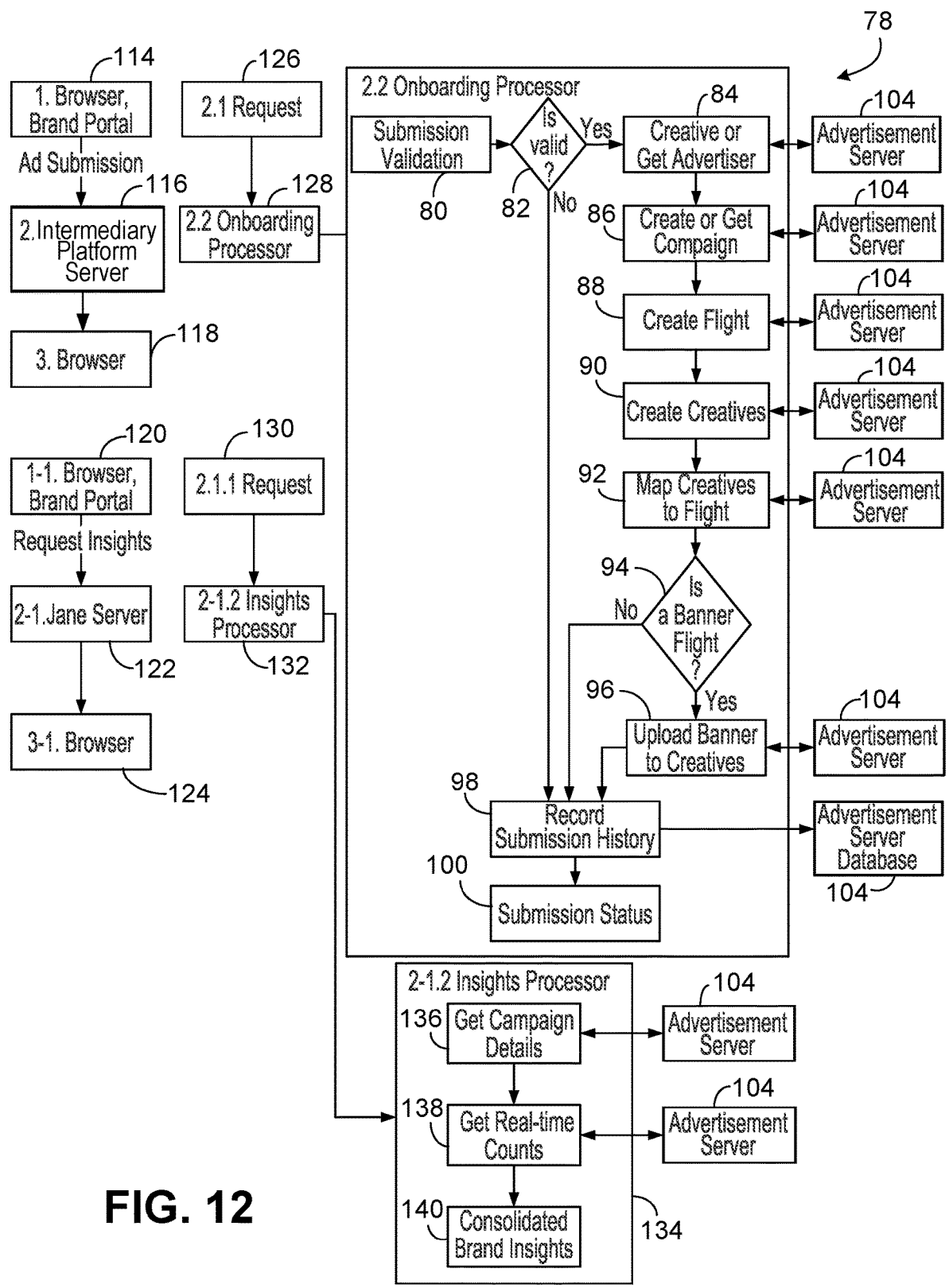

FIG. 12 shows the process flow of processes executed by the servers of the intermediary technology to enable brands to submit advertisements for placement and to provide brand placement instructions (e.g., placement data) for the advertisements. The submitted advertisements and brand placement instructions are received and processed by the servers to assure that they are acceptable for use by the intermediary technology and then are registered with an advertisement server process (e.g., a third-party advertisement server) so that the advertisement will be ready for dynamic placement by the intermediary technology when the advertisement is needed at run time.

Although the advertisement server process could be executed on the servers of the intermediary technology, in some implementations, the intermediary technology relies on an advertisement server process that is external to and exposed through APIs to the servers of the intermediary technology. In one example, the advertisement server process and the related APIs can be provided by KEVEL (https://www.kevel.co/), but a wide variety of other advertisement server processes and components of them can be provided by one or more parties. The intermediary technology uses data from the advertisement server to determine which advertisements are associated with conversion events and to provide ROI analytics back to the brands and online retail sites. For example, the intermediary technology uses the following data from the advertisement server: advertisement performance by day; advertisement impressions; revenue (which is reported to online retail sites); and a brand's daily budget.

As the brand user is entering information that makes up an advertisement submission through the brand user interface, the advertisement submission is received by an onboarding process 78. A validation process 80 is applied to the advertisement submission. If the advertisement submission is found 82 invalid, the advertisement submission details are recorded 98 in an intermediary technology database 102 and provided to a submission status process 100 which can make the submission status information available to the brand user.

If the advertisement submission is found 82 valid the information of the advertisement submission is processed by the onboarding process 78 in one or more categories to create components are needed by the advertisement server for registration of the advertisement and are compliant with the API of the advertisement server. The onboarding process creates or gets API compliant information about the brand advertiser 84; creates or gets API compliant information about the advertising campaign 86 of which the advertisement is a part; creates API compliant information about the advertising flight to which the advertisement belongs 88; creates API compliant information about advertisement creatives 90; and creates API compliant information mapping advertisement creatives to advertisement flights 92. For each of these elements of information, the advertisement server provides entity identifiers to the intermediary technology, which stores them for later use. Entity identifiers can include identifiers of an advertiser, a campaign, a flight, a creative, and others. Together they are identifiers of objects that together can define an advertisement. The identifiers can be used to construct children entities. For example, to create a campaign requires an advertiser identifier; to create a flight requires a campaign identifier, and so on.

If the advertisement flight is for a banner advertisement 94, the onboarding process 78 uploads the banner graphics to the advertisement server. If the advertisement flight is not for a banner advertisement, the submission is recorded in an intermediary technology database and made available for submission status reports.

The onboarding process is triggered when a brand user engages in the advertisement submission process through the brand user interface 114 served by the intermediary technology server 116. The advertisement submission is treated as a request 126 to the onboarding process 128.

The intermediary technology also provides insights to brand users about advertisement campaigns. Insights can be requested by a brand advertiser through the brand user interface 120 to the interface platform server. The resulting request 130 triggers execution of an insights process 132. The request can be handled by the insights process providing details of the advertisement campaign using information provided from the advertisement server. The information provided can include campaign details, real-time counts, and consolidated brand insights.

Therefore, each advertisement submission creates a flight entry in the advertisement server and triggers retrieval of recent performance data of a specific brand.

Advertisement Selection Flow

Figure 15A:
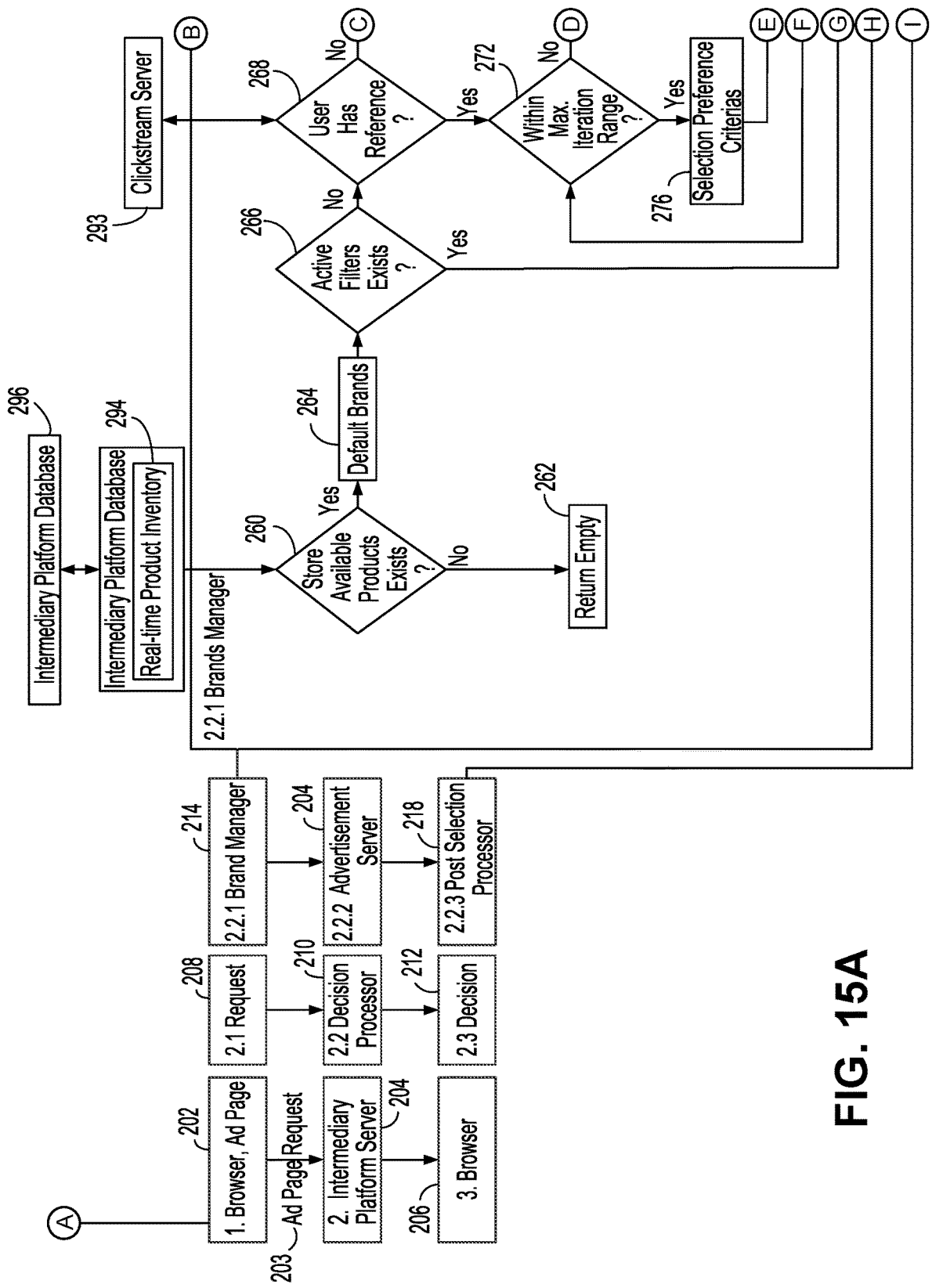

FIG. 15A shows an overview of the computer process flow for the advertisement selection process and processes that are executed after the advertisement selection. When a page being served to a browser 206 can include an advertisement or other marketing device, the browser can send a request 203 to the intermediary technology server 204 for an advertisement to be served for inclusion in the page. The resulting page in which the advertisement is included is presented to the consumer through the consumer's browser 202. The actions that occur after the placement of the advertisement in the page are illustrated in the figures and described below.

When an advertisement request from a browser 208 is received at the intermediary technology server, the request is handled by a placement decision process 210 to produce a placement decision. By analogy to traditional print advertising, the request is essentially for an advertisement to fill an "advertising hole." The placement decision specifies which advertisement should be placed in the page, and also can specify other placement parameters in addition to or as part of the choice of advertisement, including the brand whose product should be featured in the advertisement, the product of the brand to be featured in the advertisement, how long the advertisement should be placed, and the position of placement on the page. The actions of the placement decision process can include receiving information provided by the brand user as part of the advertisement submission process including the placement data. The placement decision process can use the placement data as the basis for fetching propensity data from the advertisement server 104. Based on the placement data and the propensity data (and in some cases other intermediary data), the placement decision can be made and provided to a post placement decision process 218 which implements the placement decision by a placed advertisement management process 233.

Whenever an advertisement fetch or re-fetch request is made, parameters are included in the request. In some implementations, the parameters include: current_flight_id, current_flight_ad_unit, current_creative_ids, jane_device_id, mp_distinct_id, current_root_types, and current_lineages. The current_flight_ad_unit parameter is used to ensure the new advertisement selected is the same unit type (i.e., banner, row) as the current advertisement. The current_creative_ids parameter is used to duplicated advertisement selections being made in consecutive requests which helps to enhance the advertisement selection diversity. The jane_device_id parameter is used for fetching the user preference profile and for fetching event trackings from the product analytics process. The current_root_types and current_lineages parameters are used to identify the current active filter status.

In some implementations, the events that can trigger fetching of an advertisement include a page load event, a filter updated event, and a timed re-fetch timer. Other triggering events are possible.

Advertisement Selection Process

This flow demonstrates the advertisement selection process from request to return. An advertisement request is initiated when a user lands on a page that has advertisement slots (currently the online retail site menu page). Depending on the return advertisement type, a sponsored row or banner may be rendered, Advertisements are cycled through every 30 secs when available and stopped after 10 minutes.

Jane Server is in charge of generating a personalized candidate brand list and Kevel—the 3rd party advertisement selection engine—is in charge of selecting the highest-ranking advertisement at the time of the request based on the overall serving conditions (budget fulfillment, serving period, priority status, conversion/impressions performance, etc.).

Conversion tokens are cached on Jane server during this process for later conversion event use.

Figure 13:
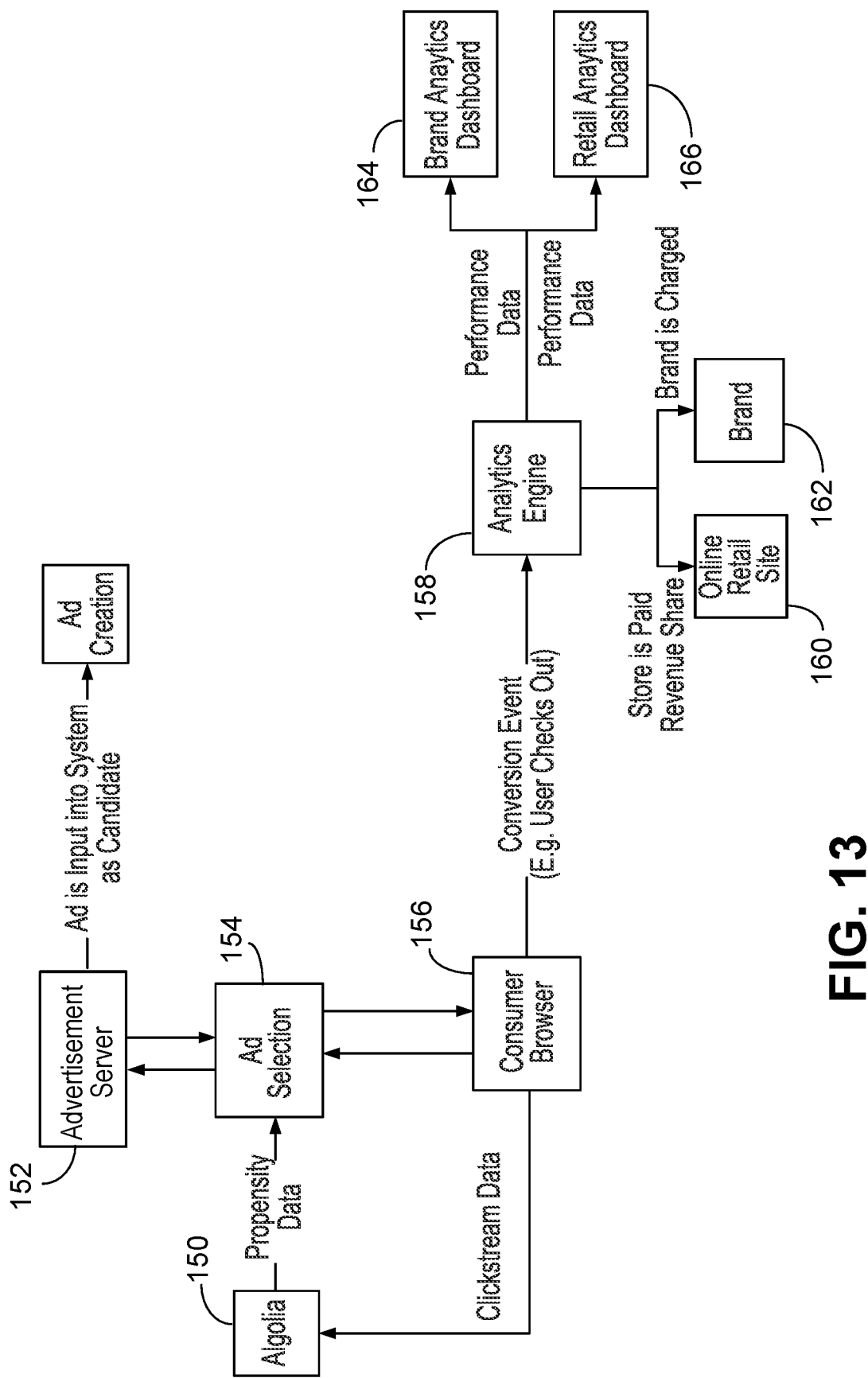

As shown in FIG. 13, in some implementations, advertisement selection can be done by an advertisement selection process 154 running on servers of the intermediary technology.

Among inputs to the advertisement selection process are the following. 1. Advertisements are provided from an advertisement server process 152 in response to advertisement selections made by the advertisement selection process and communicated to the advertisement server process. 2. Propensity data of consumers who are engaged in activities (through browsers 156) on user interfaces of online retail sites is provided by a clickstream analytics process 150 operated as software as a service. 3. Clickstream data representing the activities of the consumers (for example, products offered by Algolia at haps https://www.algolia.com/) are sent from the consumer browser.

Among outputs from the advertisement selection process are the following. 1. Identifiers of selected advertisements sent to the advertisement server process. 2. Advertisements included in web pages served to the consumer browsers.

The clickstream analytics process receives clickstream data from the consumer browser associated with corresponding consumers' activities and analyses the clickstream data and other information to derive the propensity data for the corresponding consumers. Although the Algolia products can be used in some implementations, a variety of other products and techniques can be used or obtained to derive propensity data from consumer activities on the online retail sites. The advertisement server process receives advertisements from an advertisement creation process, for example, as part of the advertisement submission process and delivers the advertisements to the advertisement selection process in response to messages that provide identifiers of the respective advertisements.

Among other functions, the advertisement selection process receives browser data from the consumer browser about activities of the consumers on the online retail online retail sites and propensity data from the clickstream analytics process and makes real-time decisions about which advertisements to embed in pages being served to the consumer browsers in order to carry out brand placement instructions of brands. When a consumer checks out and pays for a product (that is, engages in a conversion event), data about the conversion event is sent to an analytics engine 158 that processes impressions and conversion events (and other information) to generate retail advertising metrics and brand advertisement metrics which are then provided respectively to the retail analytics dashboard 166 and the brand analytics dashboard 164. The analytics engine also determines the corresponding amounts to be charged to the brands 162 and the share of the revenues from the brands to be paid to the online retail sites 160.

Figure 15B:
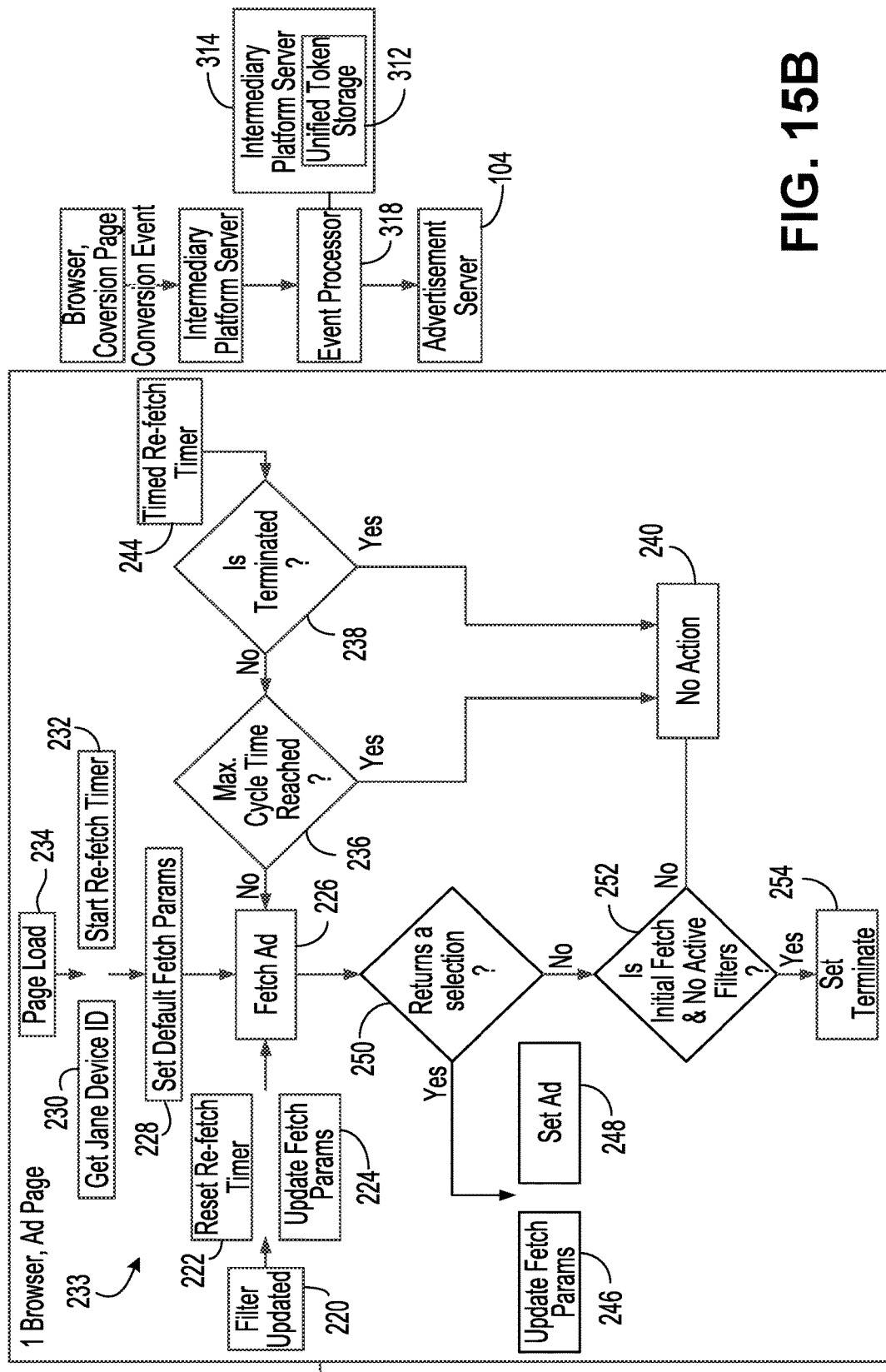

As shown in FIG. 15B, when the page with the placed advertisement is served to the browser (that is, the page is loaded 234), the process 233 is initialized. The process gets and stores an intermediary technology device identifier 230 which identifies the consumer device to which the page has been served, so that subsequent actions of the consumer on that consumer device with respect to that page can be correctly associated with the advertisement. The process 233 also starts a re-fetch timer 232 (for example a 30-second timer) to assure that the process will consider fetching a new advertisement when the timer times out. In other words, the process will fetch a replacement advertisement when a presented advertisement becomes stale. The timer times out if the consumer takes no action on the page with respect to the advertisement indicating that he is either not seeing the advertisement, or is not interested in it. Under those circumstances there is no point in wasting advertisement "space" by continuing to present the advertisement. Next the process 233 sets default fetch parameters, which are parameters that will be used in selecting an advertisement in the absence of contextually relevant information that can be used for more appropriate selection of advertisements.

After these initialization steps, an advertisement is fetched 226. Then, if a placement decision is returned 250, the identified advertisement is set 248 as the advertisement to be included in the page, and the fetch parameters are updated 250. If no placement decision is returned 250, if this is the initial request for an advertisement, and if there is no active placement data that can be applied the process terminates 254 the attempt to place an advertisement in the page. If the initial request returns no advertisement and there are no active filters, a termination flag is set. It indicates there is no available advertisement to be served at this moment for this request and that no further re-fetching request is needed.

When the re-fetch timer is counting down 244, if the advertisement placement has been terminated 238 no action is taken 240. If the advertisement placement has not been terminated and a maximum re-fetching cycle time has been reached 236, no action is taken. If the maximum re-fetching cycle time has not been reached, the advertisement selection process is called. In some implementations, the re-fetching cycle time is capped at 10 minutes. Therefore, if, after a period of time (the re-fetching cycle time), the advertisement placement process has not terminated through one of the mechanisms described in the previous paragraph, the intermediary technology will automatically terminate the process. For example, if the advertisement placement process continues to cycle through a succession of advertisements when the end of the re-fetching cycle is reached, the cycling is terminated based on an assumption that the consumer is no longer looking at the browser window. Because consumers sometimes leave their browser windows open for weeks or even months, rendering advertisements on the browser page during that period would be useless.

If the filters represented by the placement data are updated 220, the re-fetch timer is reset 222, the fetch parameters are updated, and the advertisement selection process 226 is called.

Brand Manager Process

As shown in FIG. 15A, the brand manager process uses data stored in the intermediary technology database 296 to determine if products of a brand are available in the inventory of the online retail site that is currently being used by the consumer. For this purpose, the brand manager process uses the real-time product inventory data 294 stored in the database. If there is no product of the brand in inventory 260, the brand manager process returns an empty indicator 262. If there are products in inventory, the brand manager process works on products of default brands. If active filters exist for the default brands 266, that is, if placement data have been provided by brands 264, the brand manager process creates a pool 288 and stores a list of the brands for which there are active placement data.

Based on propensity data provided from the clickstream server 294, the brand manager process determines if the consumer who is using the page is referenced in the propensity data (for example because the consumer's prior activities have been captured by the clickstream server). If not, there is no basis on which to choose any particular brand for placement of advertisements, and the brand manager process falls back to the default brands 270. If the propensity data does include a reference to this consumer, but the propensity data is not within a maximum iteration range 272, the brand manager process also falls back to the default brands 274. The maximum iteration range is a maximum number of loops through the process that selects products based on the consumer's propensity profile. For example, if the maximum number of loops (the iteration range) has a value of 3 and the brand manager process has looped 3 times already, the selection process is exited and the default brands are selected. If the propensity data is within the maximum iteration range, then the brand manager process generates a pool 282 of brands that have products that are in inventory at the online retail site 282. The pool is generated based on information about placement data of brands 276, about brands that have specified programmatic placements of advertisements 278, and about brands that have specified priority placements of advertisements 280. Information about the brand specified advertisement placements can be based on information about active advertisement campaigns of brands 296 as stored at the intermediary technology server 298. That information can be derived from data provided by the advertisement server 104.

If the resulting brands pool is empty 284, the brand manager process returns to consider a broader iteration range. If the resulting brands pool is not empty, the brand manager process uses brands that, according to the propensity data, are of interest to or preferred by the consumer.

Thus, the brand manager process generates a candidate list of brands for advertisement placement using the real-time inventory data to create the list. An online retail site must have inventory of a product for sale at the moment of the request in order for the intermediary technology to serve advertisements for the product.

The brand manager process generates lists that include a list of default brands, a list of active filter brands, and a list of user preferred brands. Only one list will be returned for use in selecting advertisements, based on different conditions. The default brands are currently available for sale in the online retail site. If active filters are present in the consumer's activities on the online retail site, the brand manager process gets the active filter brands list by querying the available brands table using the filter conditions. If active filters are not present, the brand manager process proceeds with personalization. In the personalization stage, the jane_device_id is used to fetch user preferences from the clickstream server. For example, the return preference data may look like this:

```
{
"userToken": "xxxxxxxxxxxxxx",
"lastEventAt": "2020-11-05T19:37:24Z",
"scores": {
    "brand": {
       "AbsoluteXtracts": 3,
       "Raw Garden": 14
    },
    "category": {
       "hybrid": 6,
```

```
       "indica": 2
    },
    "kind": {
       "edible": 1,
       "extract": 7
    },
    "root_types": {
       "edible": 2,
       "edible:Capsules": 2,
       "extract": 10,
       "extract:Live Resins": 9
    }
  }
}
```

The clickstream server returns a consumer profile with facets scored from 1 to 20. In some implementations, interests represented by the profile are taken from a kind and category that have a score greater or equal to 3. They are then sorted from high-to-low to form an ordered interest list.

Next, iterations are performed to generate the user preferred brands list. Starting with the consumer's first interest, the process forms a series of unions and intersections between current active advertising programmatic brands of the online retail site state and priority brands of the online retail site. If the outcome of the process is an empty list, the process is repeated for the second consumer interest, and so on until the maximum iteration limit is reached (for example, set to 2). When the maximum iteration is reached with the list empty, the default brands list is used.

The active advertisement campaigns data is cached on the intermediary technology server to provide quick access for active programmatic and priority brands. In some implementations, that data is synchronized with the advertisement server a few times per day.

Post Placement Decision Process

Figure 15C:
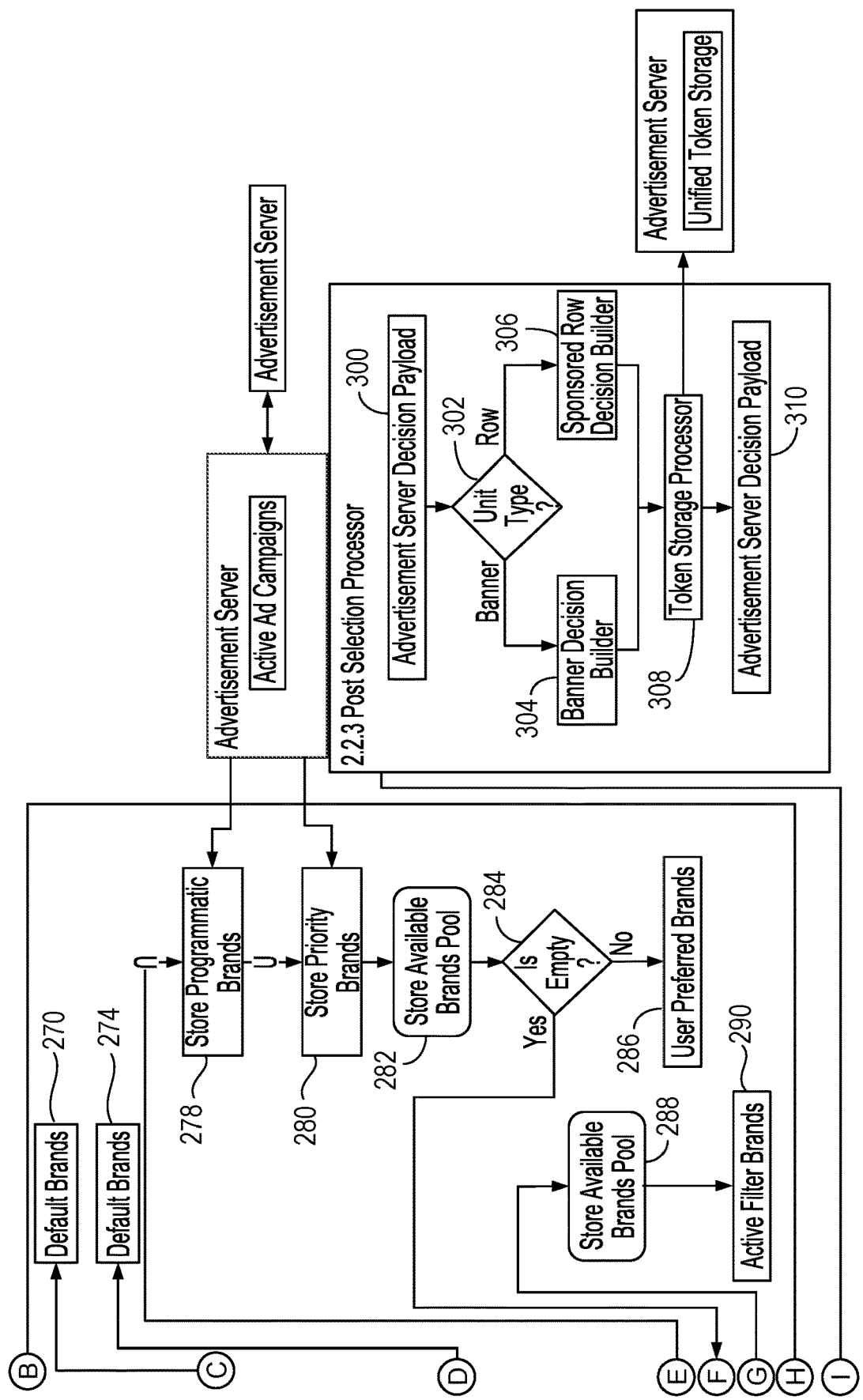

As shown in FIG. 15C, in the post placement decision process, a decision payload 300 is received from the advertisement server. One function of the post placement decision process is to translate the advertisement server's decision payload into a decision payload of the intermediary technology 310. The advertisement server's decision payload includes an identification of the unit type of the selected advertisement. The post placement decision process builds a banner decision 304 if the unit type is a banner advertisement, or builds a row decision 306 if the unit type is a row advertisement. A token process 308 generates a unique token for the advertisement and delivers it to a unified token storage 312 at the intermediary technology server 314. The token process also generates and outputs the intermediary technology decision payload 310.

The post placement decision process is used to convert the placement decision from the data provided by the advertisement server to advertisement content at the intermediary technology server. Depending on the advertisement unit type, the sponsored row has additional menu product data and the banner advertisement has banner image URLs.

In some implementations, a returned sponsored row advertisement looks like this:

```
{
"flight": {
"id": 15006475,
"ad_unit": "row",
"type": "row",
"model": "cps",
"creative_ids": [
```

```
21309210
],
"impression_url": "/sponsored/events/impress/i.gif?e=eyJ2IjoiMS43Iiwi...4",
"click_url": "/sponsored/events/click/r?e=eyJ2IjoiMS43Iiwi...",
"event_3_url": "/sponsored/events/3/e.gif?e=eyJ2IjoiMS43IiwiYX...",
"product_brand": {
"id": 35,
"name": "Elevated Extracts"
}
},
"menu_products": [
    {...},
    {...}
  ]
}
A returned banner advertisement looks like this:
{
"flight": {
"id": 15087218,
"ad_unit": "banner",
"type": "banner",
"model": "flat",
"creative_ids": [
21399808,
21399812
],
"product_brand": {
"id": 35,
"name": "Elevated Extracts"
},
"event_3_url": "/sponsored/events/3/e.gif?e=eyJ2IjoiMS43IiwiYXYi...",
"image_url_desktop": "/sponsored/images/c04c497951904811a6be0fdf29aeef13.jpg",
"image_url_mobile": "/sponsored/images/d3662ad996e049228310511968bdc1ae.jpg",
"impression_url_desktop": "/sponsored/events/impress/i.gif?e=eyJ2IjoiMS43IiwiYXYiO...",
"impression_url_mobile": "/sponsored/events/impress/i.gif?e=eyJ2IjoiMS43IiwiY...",
"click_url_desktop": "/sponsored/events/click/r?e=eyJ2IjoiMS43IiwiY...",
"click_url_mobile": "/sponsored/events/click/r?e=eyJ2IjoiMS43IiwiYXYiOj..."
},
"menu_products": [ ]
}
```

In addition, the process caches advertisement server conversion event tokens onto the intermediary technology server for later use. Depending on the advertisement model, implementations can set a cache expiration duration (i.e., conversion time window). For example, for CPS: 24 hours, for CPM: 7 days, and for priority: the same day. New tokens will overwrite any old ones that exist, thus resulting in "last touch" attribution when converted later on.

Conversion Event Process

As shown in FIG. 15B, the conversion event process provides conversion information to the advertisement server 104 based on comparison of a unique token of an advertisement that has resulted in a conversion event with a unique token stored in a unified token storage 320 of the intermediary technology server 318. This enables the conversion event process 316 to provide conversion data that correctly identifies the advertisement that is the subject of the conversion event and provide the token to the advertisement server.

This process is configured to track and attribute conversions back to the advertisement flight when the event happens. A conversion event can be, for example, a checkout event, which attributes sales to CPS flights when converted within the conversion time window.

When a consumer successfully checks out products on an online retail site, the brands of the products are sent to the intermediary technology server for conversion lookup. In some implementations, tokens are converted in this order: CPS>priority>programmatic, whichever comes first. Once converted, the consumer's token associated with the converted brand is reset. This allows for subsequent conversion tracking.

Analytics

Figure 14:
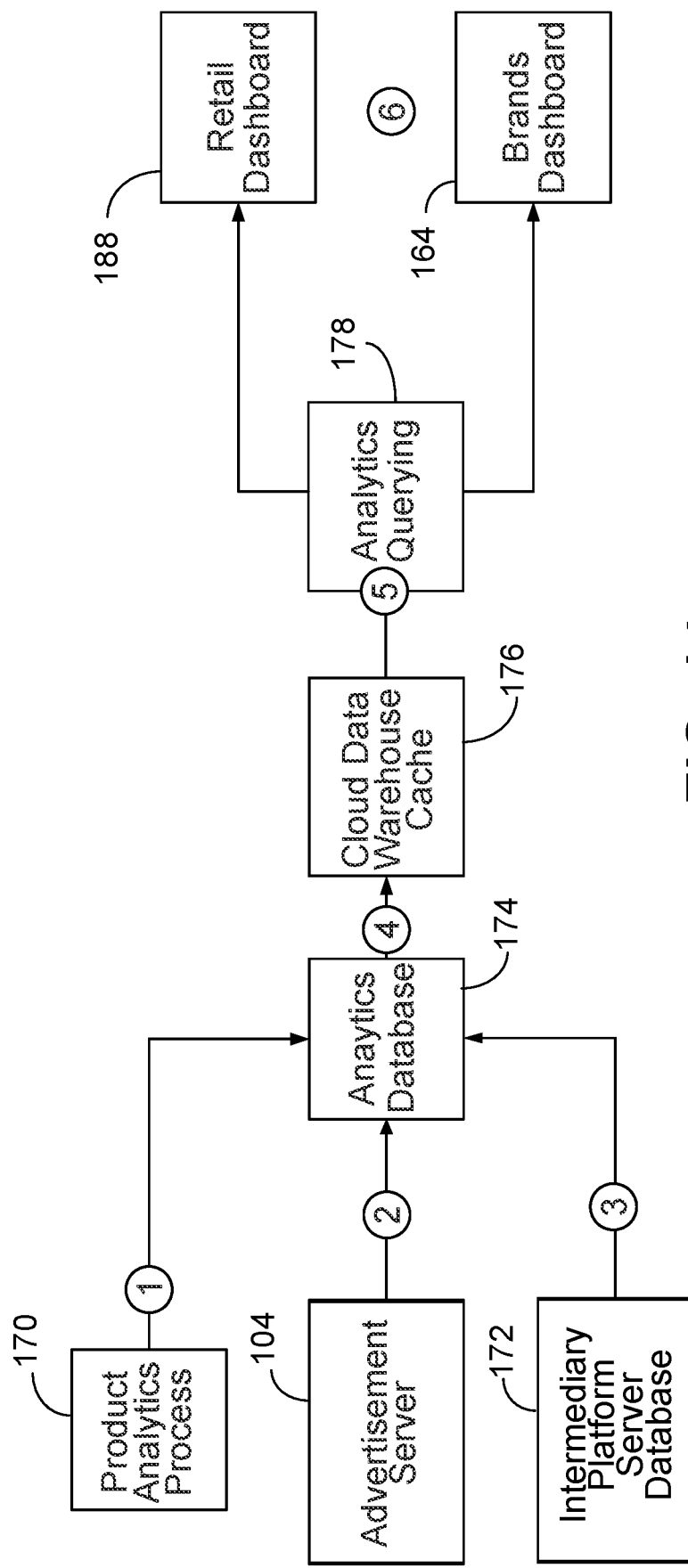

FIG. 14 shows a process by which advertising metrics and other analytics information are generated for inclusion on the retail analytics dashboard 166 and the brand analytics dashboard 164. The analytics query response process 178 receives queries of retail users and brand users from the retail analytics dashboard and the brand analytics dashboard and uses current data held in a cloud data warehouse cache 176 (maintained by Snowflake at https://www.snowflake.com/ as only one possible example) to provide responsive information to populate the dashboards. The cloud data cache is in turn populated from an analytics database 174. The analytics database stores among other things, data from a product analytics process 170 (for example Mixpanel at https://mixpanel.com/ although a variety of other processes or services could be used), from the advertisement server 104, and from an intermediary technology database 172.

The product analytics process (e.g., Mixpanel) stores clickstream data from the online retail sites, including all recorded interactions of a consumer on the pages served by the intermediary technology. Among the events recorded and stored in the analytics database of the intermediary technology are one or more of the following (and others): an impression event of an advertisement on the online retail site which records when an advertisement was impressed on a selectable control of a page and the identity of the consumer who was using the online retail site; a flight ID (e.g., a unique identifier of an advertisement flight); a brand identifier; an online retail site identifier; the advertisement unit (e.g. row or sponsored banner); jDeviceId (a unique device-specific identifier of a consumer); a menu load event used to determine all consumers who loaded the gallery of the online retail site (one cohort saw an advertisement; the complementary cohort did not see an advertisement; the intermediary technology looks at the conversion rate for both cohorts in anticipation of higher conversion for consumers in the chort who saw the advertisement; and checked out cart (to determine all consumers who have checked out, which is used as an input to determine the conversion rate for consumers who saw the advertisement).

An analytical process is executed to respond to analytics queries. The responses can indicate a wide variety of analytical results, including: whether a brand's campaign was associated with a conversion event; the ROI of a brand's campaign; the checkout conversion difference between consumers in the "saw ad" cohort and those in the complementary cohort; the overall conversion lift on the online retail site's gallery; and the revenue earned by the online retail site for publishing marketing devices from the intermediary technology.

Combination with Brand Market Site

The intermediary technology features can be combined with and provide the features of the brand site marketing technology described in the published United States patent application serial 2021/0097593, published Apr. 1, 2021, the entire contents of which are incorporated here by reference. That patent application was attached in its entirety as an appendix to the provisional application from which this application claims the benefit of priority. That technology enables the intermediary technology described here also to present and embed through brand sites, brand markets that list retailers that are known to carry a product or products of the brand and known to have them in inventory and their current prices for the products. The consumer on the brand site can then choose a retailer from which to buy the product and make the purchase directly from the brand site. This consumer marketing can be combined with the consumer marketing described above as part of the intermediary technology to provide a combined system for marketing by brands and other advertisers. Brand site marketing described in the cited patent application and the marketing facilitated by the intermediary technology described above can both make sure of inventory data captured from the online retail sites.

Other implementations are also within the scope of the following claims.

The invention claimed is:

1. A computer-implemented method comprising:
   determining, by an intermediate technology server and using inventory data for an online retail site that uses the intermediate technology server as an online retail catalog manager, a marketing device for a product of a brand for presentation with an online retail catalog, the determining comprising:
   determining, by the intermediate technology server, whether a product of a brand is currently in inventory and available for sale at the online retail site, and whether criteria for the brand for placement of a first marketing device on the online retail site are satisfied, the criteria for the brand comprising one or more criteria other than whether a product of the brand is currently in inventory and available for sale at the online retail site;
   in response to determining either that a product of the brand is not current in inventory and is not available for sale at the online retail site, that the criteria for the brand for placement of the first marketing device are not satisfied, or both:
      selecting, by the intermediate technology server and using the inventory data for the online retail site and as the marketing device, a second marketing device a) for another brand that is a different brand than the brand for which another product of the other brand is currently in inventory and available for sale at the online retail site and b) that includes a link to a web page for the other product on the online retail site; and
      serving, by the intermediate technology server and for presentation on a client device during a browsing session, the online retail catalog including the second marketing device for presentation on the online retail site;
   receiving data that indicates interactions by the client device during the browsing session with one or more products in the online retail catalog;
   generating, using propensity data for the client device and the data that indicates the interactions by the client device with the one or more products in the online retail catalog, second propensity data for the client device that is different than the propensity data;
   determining, using the second propensity data and the inventory data for the online retail site, that the second propensity data satisfies second criteria for a second brand for placement of a third marketing device for a second product of the second brand on the online retail site and that the second product of the second brand is currently in inventory and available for sale at the online retail site; and
   in response to determining that the second propensity data satisfies the second criteria for the second brand for placement of the third marketing device for the second product of the second brand on the online retail site and that the second product of the second brand is currently in inventory and available for sale at the online retail site:
      serving, for presentation on the client device during the browsing session, the third marketing device for the second product that includes a second link to a second web page for the second product on the online retail site to cause the client device to replace a presentation of the second marketing device with a presentation of the third marketing device.

2. The method of claim 1, wherein:
selecting the second marketing device comprises converting, by the intermediate technology server, a payload of the second marketing device from a format that is associated with an advertising server to a format that is associated with the intermediate technology server and that includes the link to the web page for the other product on the online retail site; and
serving the online retail catalog comprises serving the online retail catalog including the converted payload of the second marketing device for presentation on the online retail site.

3. The method of claim 1, wherein:
determining whether the criteria for the brand for placement of the marketing device on the online retail site are satisfied comprises determining whether propensity data for the client device satisfy the criteria for the brand for placement of the marketing device on the online retail site; and selecting the second marketing device and serving the online retail catalog are both responsive to determining that the propensity data for the client device do not satisfy the criteria for the brand for placement of the marketing device on the online retail site.

4. The method of claim 1, wherein:
selecting the second marketing device and serving the online retail catalog are both responsive to determining, using the inventory data, that the product of the brand is not currently in inventory and is not available for sale at the online retail site.

5. The method of claim 1, comprising:
determining that the criteria for the brand for placement of the marketing device on the online retail site are satisfied; and
determining, using the inventory data, that no products of the brand are currently in inventory and available for sale at the online retail site, wherein:
selecting the second marketing device and serving the online retail catalog are both responsive to determining, using the inventory data, that no products of the brand are currently in inventory and available for sale at the online retail site.

6. The method of claim 1, comprising receiving, by the intermediate technology server and from a device for the online retail site, the inventory data identifying products that are in inventory and available for sale at the online retail site.

7. The method of claim 1, comprising receiving, by the intermediate technology server, the criteria for the brand for placement of the marketing device on the online retail site.

8. A intermediate technology system comprising one or more computers and one or more storage devices on which are stored instructions that are operable, when executed by the one or more computers, to cause the one or more computers to perform operations comprising:
serving, for presentation during a browsing session of a client device accessing an online retail site that uses the intermediate technology system as an online retail catalog manager, an online retail catalog that includes a first marketing device for a first product for presentation on the online retail site in response to determining that the first product of a first brand is currently in inventory and available for sale at the online retail site, and that first propensity data for the client device satisfy first criteria for the first brand for placement of the first marketing device on the online retail site, wherein the first marketing device includes a first link to a first web page for the first product on the online retail site;
receiving data that indicates interactions by the client device during the browsing session with one or more products in the online retail catalog;
generating, using the first propensity data and the data that indicates the interactions by the client device with the one or more products in the online retail catalog, second propensity data for the client device that is different than the first propensity data;
determining that the second propensity data does not satisfy the first criteria for the first brand;
determining, using the second propensity data and inventory data for the online retail site, that the second propensity data satisfies second criteria for a second brand for placement of a second marketing device for a second product of the second brand on the online retail site and that the second product of the second brand is currently in inventory and available for sale at the online retail site; and in response to determining that the second propensity data satisfies the second criteria for the second brand for placement of the second marketing device for the second product of the second brand on the online retail site and that the second product of the second brand is currently in inventory and available for sale at the online retail site:
serving, for presentation on the client device during the browsing session, the second marketing device for the second product that includes a second link to a second web page for the second product on the online retail site to cause the client device to replace a presentation of the first marketing device with a presentation of the second marketing device.

9. The system of claim 8, the operations comprising converting a payload of the second marketing device from a format that is associated with an advertising server to a format that is associated with the intermediate technology system and that includes the second link to the second web page for the second product on the online retail site.

10. The system of claim 8, the operations comprising determining, using the second propensity data and inventory data for the online retail site, whether the second propensity data satisfies the second criteria for a second brand for placement of a second marketing device for a second product of the second brand on the online retail site and whether the second product of the second brand is currently in inventory and available for sale at the online retail site is performed in response to determining that the second propensity data does not satisfy the first criteria for the first brand.

11. The system of claim 8, the operations comprising:
after serving the online retail catalog that includes the first marketing device for the first product, determining, during the browsing session, that the first product of a first brand is no longer currently in inventory and is not available for sale at the online retail site; and
in response to determining, during the browsing session, that the first product of a first brand is no longer currently in inventory and is not available for sale at the online retail site, determining, using the second propensity data and inventory data for the online retail site, whether the second propensity data satisfies the second criteria for a second brand for placement of a second marketing device for a second product of the second brand on the online retail site and whether the second product of the second brand is currently in inventory and available for sale at the online retail site.

12. The system of claim 8, the operations comprising:
determining, using the inventory data and for the browsing session, whether a third product of a third brand is currently in inventory and available for sale at the online retail site, and whether third criteria for the third brand for placement of a third marketing device on the online retail site are satisfied; and
in response to determining either that the third product of the third brand is not current in inventory and is not available for sale at the online retail site, that the third criteria for the third brand for placement of the third marketing device are not satisfied, or both:
serving, for presentation during the browsing session of the client device, the online retail catalog that includes the first marketing device for the first product for presentation on the online retail site.

13. One or more non-transitory computer storage media encoded with instructions that, when executed by one or more computers, cause the one or more computers to perform operations comprising:
   determining, by an intermediate technology server and using inventory data for an online retail site that uses the intermediate technology server as an online retail catalog manager, a marketing device for a product of a brand for presentation with an online retail catalog, the determining comprising:
   determining, by the intermediate technology server, whether a product of a brand is currently in inventory and available for sale at the online retail site, and whether criteria for the brand for placement of a first marketing device on the online retail site are satisfied, the criteria for the brand comprising one or more criteria other than whether a product of the brand is currently in inventory and available for sale at the online retail site;
   in response to determining either that a product of the brand is not current in inventory and is not available for sale at the online retail site, that the criteria for the brand for placement of the first marketing device are not satisfied, or both:
      selecting, by the intermediate technology server and using the inventory data for the online retail site and as the marketing device, a second marketing device a) for another brand that is a different brand than the brand for which another product of the other brand is currently in inventory and available for sale at the online retail site and b) that includes a link to a web page for the other product on the online retail site; and
      serving, by the intermediate technology server and for presentation on a client device during a browsing session, the online retail catalog including the second marketing device for presentation on the online retail site;
   receiving data that indicates interactions by the client device during the browsing session with one or more products in the online retail catalog;
   generating, using propensity data for the client device and the data that indicates the interactions by the client device with the one or more products in the online retail catalog, second propensity data for the client device that is different than the propensity data;
   determining, using the second propensity data and the inventory data for the online retail site, that the second propensity data satisfies second criteria for a second brand for placement of a third marketing device for a second product of the second brand on the online retail site and that the second product of the second brand is currently in inventory and available for sale at the online retail site; and
   in response to determining that the second propensity data satisfies the second criteria for the second brand for placement of the third marketing device for the second product of the second brand on the online retail site and that the second product of the second brand is currently in inventory and available for sale at the online retail site:
      serving, for presentation on the client device during the browsing session, the third marketing device for the second product that includes a second link to a second web page for the second product on the online retail site to cause the client device to replace a presentation of the second marketing device with a presentation of the third marketing device.

14. The computer storage media of claim 13, wherein:
   selecting the second marketing device comprises converting, by the intermediate technology server, a payload of the second marketing device from a format that is associated with an advertising server to a format that is associated with the intermediate technology server and that includes the link to the web page for the other product on the online retail site; and
   serving the online retail catalog comprises serving the online retail catalog including the converted payload of the second marketing device for presentation on the online retail site.

15. The computer storage media of claim 13, wherein:
   determining whether the criteria for the brand for placement of the marketing device on the online retail site are satisfied comprises determining whether propensity data for the client device satisfy the criteria for the brand for placement of the marketing device on the online retail site; and
   selecting the second marketing device and serving the online retail catalog are both responsive to determining that the propensity data for the client device do not satisfy the criteria for the brand for placement of the marketing device on the online retail site.

16. The computer storage media of claim 13, wherein:
   selecting the second marketing device and serving the online retail catalog are both responsive to determining, using the inventory data, that the product of the brand is not currently in inventory and is not available for sale at the online retail site.

17. The computer storage media of claim 13, the operations comprising:
   determining that the criteria for the brand for placement of the marketing device on the online retail site are satisfied; and
   determining, using the inventory data, that no products of the brand are currently in inventory and available for sale at the online retail site, wherein:
   selecting the second marketing device and serving the online retail catalog are both responsive to determining, using the inventory data, that no products of the brand are currently in inventory and available for sale at the online retail site.

18. The computer storage media of claim 13, the operations comprising receiving, by the intermediate technology server and from a device for the online retail site, the inventory data identifying products that are in inventory and available for sale at the online retail site.

19. The computer storage media of claim 13, the operations comprising receiving, by the intermediate technology server, the criteria for the brand for placement of the marketing device on the online retail site.

* * * * *